US012623834B2

(12) United States Patent　　　　(10) Patent No.:　US 12,623,834 B2

Tompane et al.　　　　　　　　　　(45) Date of Patent:　　May 12, 2026

(54) METHODS OF ASSEMBLY OF PREFABRICATED TRUSS CONSTRUCTION MODULES

(71) Applicants: Kyle Tompane, San Diego, CA (US); Greg Otto, Los Angeles, CA (US)

(72) Inventors: Kyle Tompane, San Diego, CA (US); Greg Otto, Los Angeles, CA (US)

(73) Assignee: TektonOS, Inc., San Diego, CA (US)

( * ) Notice: Subject to any disclaimer, the term of this patent is extended or adjusted under 35 U.S.C. 154(b) by 0 days.

(21) Appl. No.: 18/409,024

(22) Filed: Jan. 10, 2024

(65) Prior Publication Data

US 2024/0140693 A1　　May 2, 2024

Related U.S. Application Data

(63) Continuation-in-part of application No. 18/380,107, filed on Oct. 13, 2023, which is a continuation of application No. 18/116,756, filed on Mar. 2, 2023, now Pat. No. 11,801,990, which is a continuation of application No. 17/752,804, filed on May 24, 2022, now Pat. No. 11,603,260, and a continuation-in-part of application No. 17/752,799, filed on May 24, 2022.

(51) Int. Cl.
| | |
|---|---|
| *B65D 88/12* | (2006.01) |
| *B65D 90/00* | (2006.01) |
| *B65G 65/30* | (2006.01) |
| *E04B 2/70* | (2006.01) |

(52) U.S. Cl.
CPC ......... *B65D 88/121* (2013.01); *B65D 88/125* (2013.01); *B65D 90/004* (2013.01); *B65G 65/30* (2013.01); *E04B 2/70* (2013.01)

(58) Field of Classification Search
CPC .. B65D 88/121; B65D 88/125; B65D 90/004; B65G 65/30; E04B 2/70
USPC ......................................................... 414/809
See application file for complete search history.

(56) References Cited

U.S. PATENT DOCUMENTS

| | | | | |
|---|---|---|---|---|
| 1,459,761 A | * | 6/1923 | Andrews | E04B 1/26 |
| | | | | 52/262 |
| 2,337,224 A | * | 12/1943 | Benoist | E04B 2/702 |
| | | | | 52/261 |
| 2,827,676 A | * | 3/1958 | Sanford | F16B 15/0046 |
| | | | | 403/231 |

(Continued)

*Primary Examiner* — James J Buckle, Jr.
(74) *Attorney, Agent, or Firm* — James A. Italia; Italia IP

(57) ABSTRACT

The disclosure provides a method that includes providing or assembling a rectangular horizontal member, joining a vertical member to the rectangular horizontal member such that the vertical member bisects a length of the horizontal member and forms a T-junction at the horizontal member, joining first and second sloped members to the rectangular horizontal member and vertical member such that the first and second sloped members span from a top of the vertical member to opposing ends of the horizontal member, and joining first and second support members such that the first and second support members span from the T-junction between the vertical member and horizontal member to work points on an underside of each of the first and second sloped members. The structure thus formed can be assembled from prefabricated units shipped together in parallel planar orientation in a shipping container to provide a roof truss unit.

23 Claims, 37 Drawing Sheets

(56)  References Cited

U.S. PATENT DOCUMENTS

| 3,599,562 | A  | * | 8/1971 | Hutchens, Sr. | B27F 7/155 |
| | | | | | 100/231 |
| 3,908,322 | A  | * | 9/1975 | Shoaf | E04B 2/70 |
| | | | | | 52/92.1 |
| 4,083,154 | A  | * | 4/1978 | Klink | E04B 1/34815 |
| | | | | | 52/79.9 |
| 4,414,787 | A  | * | 11/1983 | Kappen | E04C 3/17 |
| | | | | | 52/693 |
| 4,429,500 | A  | * | 2/1984 | Farmont | E04B 2/702 |
| | | | | | 446/106 |
| 5,622,022 | A  | * | 4/1997 | Haisch | E04C 3/17 |
| | | | | | 52/696 |
| 6,047,513 | A  | * | 4/2000 | Gibson | E04B 1/24 |
| | | | | | 52/645 |
| 6,983,567 | B2 | * | 1/2006 | Ciotti | E04B 1/3442 |
| | | | | | 52/79.5 |
| 7,093,628 | B2 | * | 8/2006 | Kelly | B27C 5/08 |
| | | | | | 144/41 |
| 9,016,001 | B2 | * | 4/2015 | Heger | E04B 1/34384 |
| | | | | | 52/79.5 |
| 10,501,260 | B2 | * | 12/2019 | Brennan, Jr. | E04B 1/3483 |
| 10,697,193 | B2 | * | 6/2020 | Tafuro | E04B 1/34305 |
| 10,738,459 | B2 | * | 8/2020 | Brown | F41H 5/24 |
| 10,889,984 | B2 | * | 1/2021 | Arguin | E04F 13/0894 |
| 11,142,910 | B2 | * | 10/2021 | Kanawyer | E04C 3/17 |
| 12,392,129 | B2 | * | 8/2025 | Ochiai | E04B 7/045 |
| 2006/0213130 | A1 | * | 9/2006 | Kessler | E04H 6/02 |
| | | | | | 52/64 |
| 2008/0134589 | A1 | * | 6/2008 | Abrams | E04B 1/34807 |
| | | | | | 52/79.1 |
| 2008/0209820 | A1 | * | 9/2008 | Muir | E04B 1/3445 |
| | | | | | 52/79.5 |
| 2011/0252724 | A1 | * | 10/2011 | Heisler | E04D 13/0477 |
| | | | | | 52/173.3 |
| 2012/0180404 | A1 | * | 7/2012 | Scouten | E04B 1/34321 |
| | | | | | 52/79.5 |
| 2013/0067846 | A1 | * | 3/2013 | Kvols | E04B 1/34315 |
| | | | | | 52/586.1 |
| 2013/0074424 | A1 | * | 3/2013 | Trascher | E04B 1/34384 |
| | | | | | 52/79.5 |
| 2013/0160396 | A1 | * | 6/2013 | Heisler | E04B 7/04 |
| | | | | | 52/745.21 |
| 2013/0305629 | A1 | * | 11/2013 | Stephenson | E04H 1/005 |
| | | | | | 52/79.9 |
| 2014/0130442 | A1 | * | 5/2014 | Fuller | E04G 21/1891 |
| | | | | | 52/696 |
| 2016/0348369 | A1 | * | 12/2016 | Godfrey | E04B 7/20 |
| 2017/0037591 | A1 | * | 2/2017 | Stein | E04B 5/326 |
| 2017/0306610 | A1 | * | 10/2017 | Leahy | E04B 1/74 |
| 2019/0168092 | A1 | * | 6/2019 | Beaver | A63B 17/02 |
| 2019/0168410 | A1 | * | 6/2019 | Conboy | E04B 1/10 |
| 2021/0381219 | A1 | * | 12/2021 | Witt | E04H 1/12 |
| 2022/0074194 | A1 | * | 3/2022 | Clark | E04H 1/04 |
| 2023/0148153 | A1 | * | 5/2023 | Jobson | E04H 6/02 |
| | | | | | 52/79.7 |
| 2023/0202750 | A1 | * | 6/2023 | Eisold | B65D 88/127 |
| | | | | | 220/1.5 |
| 2023/0235584 | A1 | * | 7/2023 | Rowan | E04H 3/10 |
| | | | | | 52/79.9 |
| 2024/0091982 | A1 | * | 3/2024 | Kanjee | B27M 3/0073 |

* cited by examiner

*PRIOR ART*

*PRIOR ART*

PRIOR ART

SECTION A-A

SECTION B-B

20

Ceiling Drywall

METHODS OF ASSEMBLY OF PREFABRICATED TRUSS CONSTRUCTION MODULES

CROSS-REFERENCE TO RELATED APPLICATIONS

The present application is a continuation-in-part of U.S. Non-Provisional patent application Ser. No. 17/752,799 filed on May 24, 2022 and a continuation-in-part of U.S. Non-Provisional patent application Ser. No. 18/380,107 filed on Oct. 13, 2023, which was a continuation application of U.S. Non-Provisional Patent Application Ser. No. 18,116,756 filed on Mar. 2, 2023 now U.S. Pat. No. 11,801,990, which was a continuation application of U.S. Non-Provisional Patent Application Ser. No. 17,752,804 filed on May 24, 2022 now U.S. Pat. No. 11,603,260, all of which are incorporated by reference in their entireties.

FIELD

The present disclosure is directed to the field of construction. More particularly, the present disclosure relates to prefabricated construction modules designed for manufacturing roof trusses and methods of assembly and shipping.

BACKGROUND

Trusses are built with all members either in tension or compression. The members converge at nodes (referred to as work points). Examples of conventional trusses are shown in FIGS. 1-4. Planar trusses are not stable out of plane making them difficult to handle until braced. This presents significant safety risk to installers as work is done in elevated conditions. What is needed for maximum safety and efficiency is a prefabricated solution that can be built mostly on ground and is stable.

SUMMARY

In general, in a first aspect, the disclosure features an article of manufacture. The article of manufacture includes a rectangular horizontal member, a vertical member bisecting a length of the horizontal member and forming a T-junction at the horizontal member, first and second sloped members spanning from a top of the vertical member to opposing ends of the horizontal member, and first and second support members spanning from the T-junction between the vertical member and horizontal member to work points on an underside of each of the first and second sloped members.

In general, in a second aspect, the disclosure features a method. The method includes providing or assembling a rectangular horizontal member, joining a vertical member to the rectangular horizontal member such that the vertical member bisects a length of the horizontal member and forms a T-junction at the horizontal member, joining first and second sloped members to the rectangular horizontal member and vertical member such that the first and second sloped members span from a top of the vertical member to opposing ends of the horizontal member, and joining first and second support members such that the first and second support members span from the T-junction between the vertical member and horizontal member to work points on an underside of each of the first and second sloped members.

In general, in a third aspect, the disclosure features a shipping container, The shipping container has first, second, and third planar prefabricated modules capable of forming an article of manufacture of the disclosure as cargo in the interior of the shipping container, the prefabricated modules stacked vertically in parallel planar orientation, the shipping container having an open top capable of top loading and unloading.

In general, in a fourth aspect, the disclosure features a method. The method includes loading a shipping container with first, second, and third planar prefabricated modules capable of forming an article of manufacture of the disclosure as cargo in the interior of the shipping container through an open top of the shipping container, the prefabricated modules stacked vertically in parallel planar orientation.

Features of the articles of manufacture and methods can include the following. The horizontal members, vertical members, sloped members, support members, and combinations thereof can take the form of structures such as panels, frames, and planks or beams, and combinations thereof. Ends of the first and second support members can have a precision cut design to fit a corresponding groove at the work points on an underside of the first and second sloped members. The rectangular horizontal member, vertical member, first and second sloped members, and first and second support members can be made of wood and can form a truss unit for manufacture of a roof structure when assembled together. A roof structure can overlie the truss unit or can be joined to overly the truss unit. Filler units representing ceiling panels or frames can flank or can be joined to flank on either side of the truss unit, where the roof structure overlies the truss unit and flanking filler units. Two truss units can flank or can be joined to flank a filler unit representing a ceiling panel or frame, where the roof structure overlies the filler unit and flanking truss units. The truss unit can have a plank or can be joined with a plank that spans a top of the truss unit and a width of each of the flanking filler units, the plank forming a ridge to support the roof structure, or the truss units can have a plank or can be joined with a plank that spans a top of the two truss units and a width of the filler unit therebetween, the plank forming a ridge to support the roof structure. The roof structure can include panels overlying alternating truss units and filler units representing ceiling panels or frames. The roof structure can include a frame, panels overlying the frame, and roofing material overlying the panels. Members of the frame can be compressed together by a web of wiring connecting the members, or such web of wiring can be weaved to connect and compress members of the frame of the roof structure together. The truss unit can be assembled such that the steps of assembly are performed on the ground of a construction site. The first prefabricated module can include the rectangular horizontal member, the second prefabricated module can include the vertical member, first and second sloped members, and first and second support members collapsed in parallel orientation to each other, and the third prefabricated module can include the roof structure.

It should be understood that the articles of manufacture and methods are not to be considered limitations on the invention defined by the claims. The featured articles of manufacture and methods can be implemented in one or more ways using one or more features depicted in the drawings, described in the detailed description, and set forth in the claims.

BRIEF DESCRIPTION OF THE DRAWINGS

The accompanying drawings illustrate certain aspects and principles of the implementations set forth, and should not be construed as limiting.

FIGS. 32-35 show prefabricated roof truss components stacked in horizontal orientation and FIGS. 36 and 37 show prefabricated roof truss components stacked in vertical orientation, with FIG. 36 showing the prefabricated roof truss components stacked in a shipping container and FIG. 37 showing the load bundle inside the container. FIGS. 32, 36, and 37 show angular views, FIG. 33 shows a top view, FIG. 34 shows a side view, and FIG. 35 shows a front view.

DETAILED DESCRIPTION

Reference will now be made in detail to various illustrative implementations. It is to be understood that the following discussion of the implementations is not intended to be limiting.

The disclosure features implementations of a roof truss unit and corresponding roof structure as well as a method of a manufacture or assembly of a roof truss unit and corresponding roof structure. The roof truss is assembled with structural components including horizontal members, vertical members, sloped members, and support members. The horizontal members, vertical members, sloped members, and support members can be or include a panel, a structural beam or plank or frame made of individual beams or planks, or a combinations thereof. The roof truss can be assembled in a specific order of steps, such as first assembling or providing a horizontal member. The horizontal member is placed on a surface such as the ground of a leveled construction site. A vertical member is then placed perpendicularly such that it bisects a length of the horizontal member and forms a T-junction with the horizontal member. A pair of sloped members can then be placed on either side of the vertical member such that they are supported by the vertical member at one end of the sloped member, where the opposing ends of the sloped members rests on opposed ends of the horizontal member. Together the horizontal member, vertical member, and pair of sloped members provide a three dimensional unit that is stable. The structure is completed by installing a pair of support members where each support member spans from a first work point at a T-junction of the vertical member and horizontal member to a second work point at a mid-region or center on an underside of the sloped member. The horizontal members, vertical members, sloped members, support members, and combinations thereof can take the form of structures such as panels, frames, and planks or beams and can be made of lumber or other suitable construction material. The horizontal members, vertical members, sloped members, support members, and combinations thereof can be provided as prefabricated units ready for installation at a construction site. The prefabricated units are planar and capable of being stacked horizontally or vertically in parallel to each other and shipped in containers suitable for intermodal transport. The truss units can be assembled on the ground from the prefabricated units and placed on a roof by a crane in various combinations with spacer or filler units interspersed in between, which together provide for a structural foundation for completion of the roof of a house or other residential or commercial structure.

Figure 1:
FIGS. 1-4 are diagrams of conventional roof truss construction, with FIG. 1 providing a side view, FIG. 2 providing a front view, and FIGS. 3 and 4 providing angular views.
Figure 1:
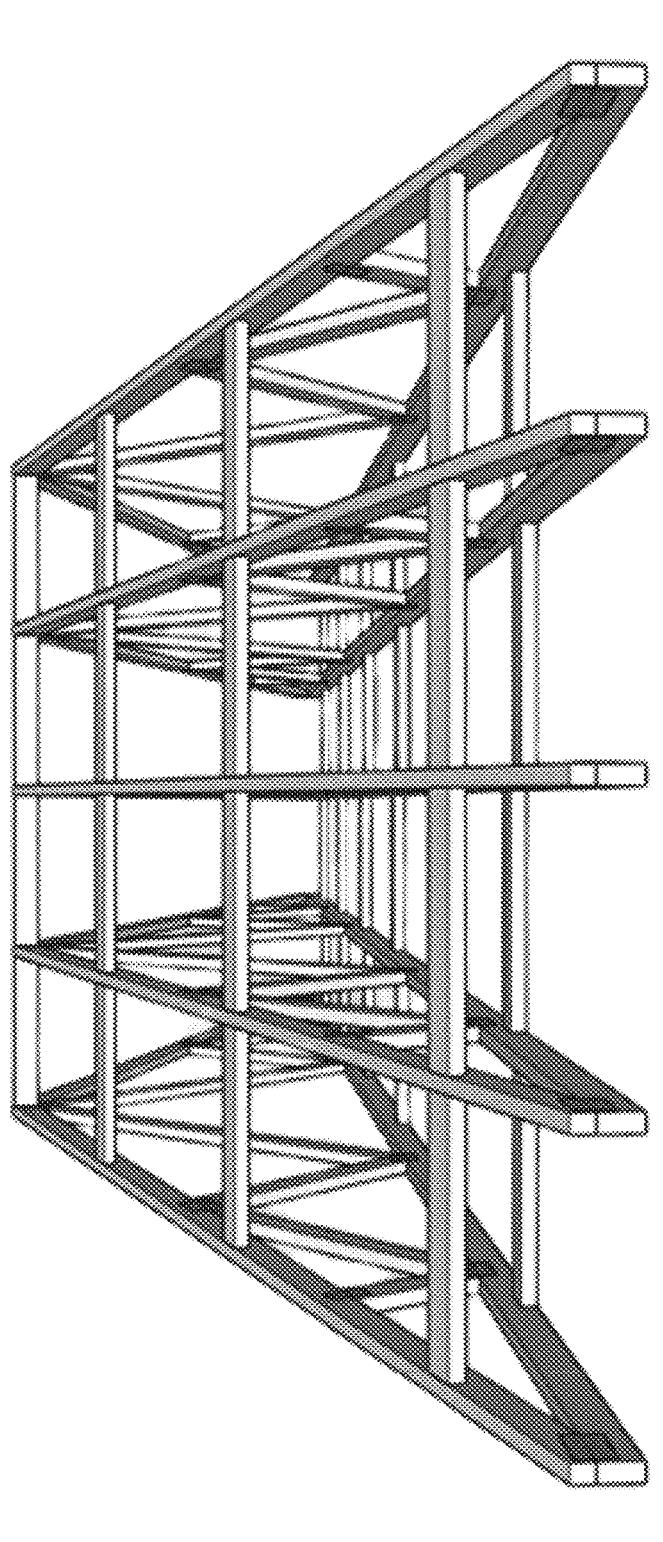
Figure 2:
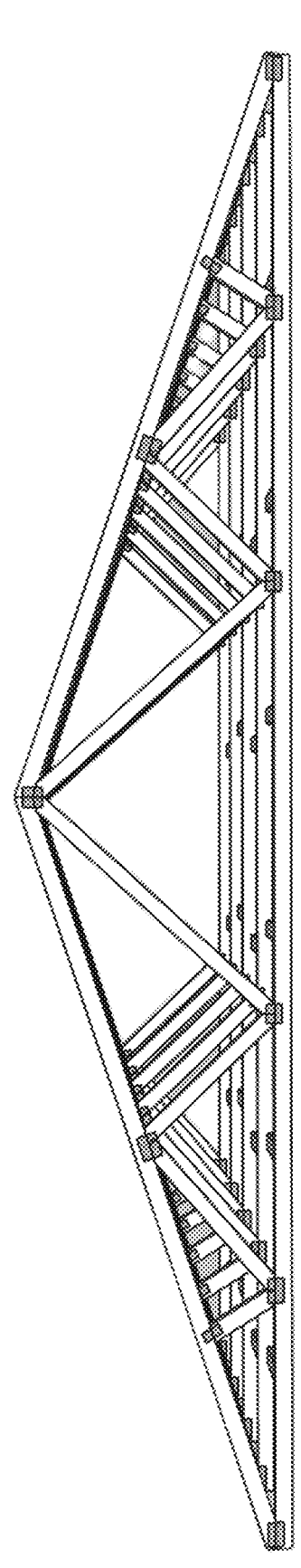
Figure 3:
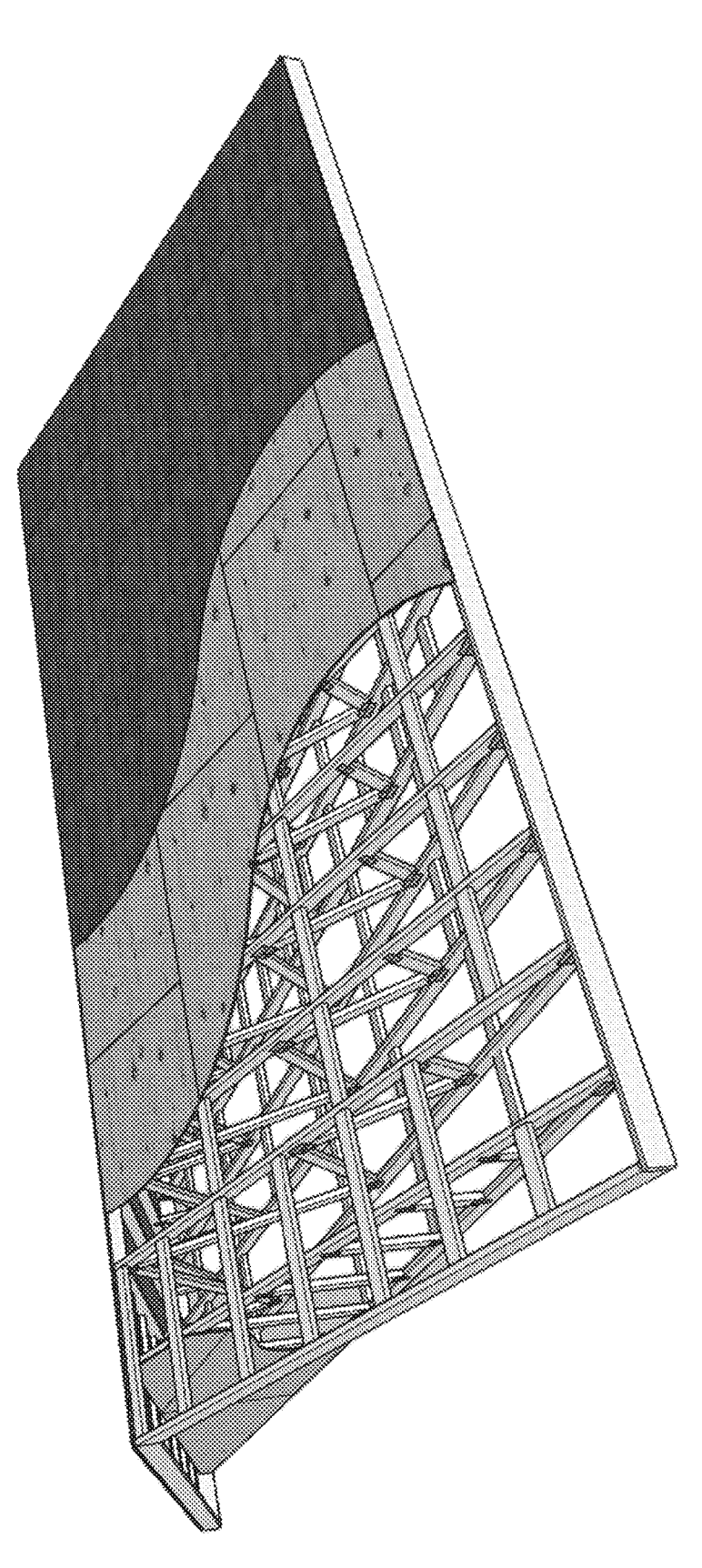
Figure 4:
Figure 5:
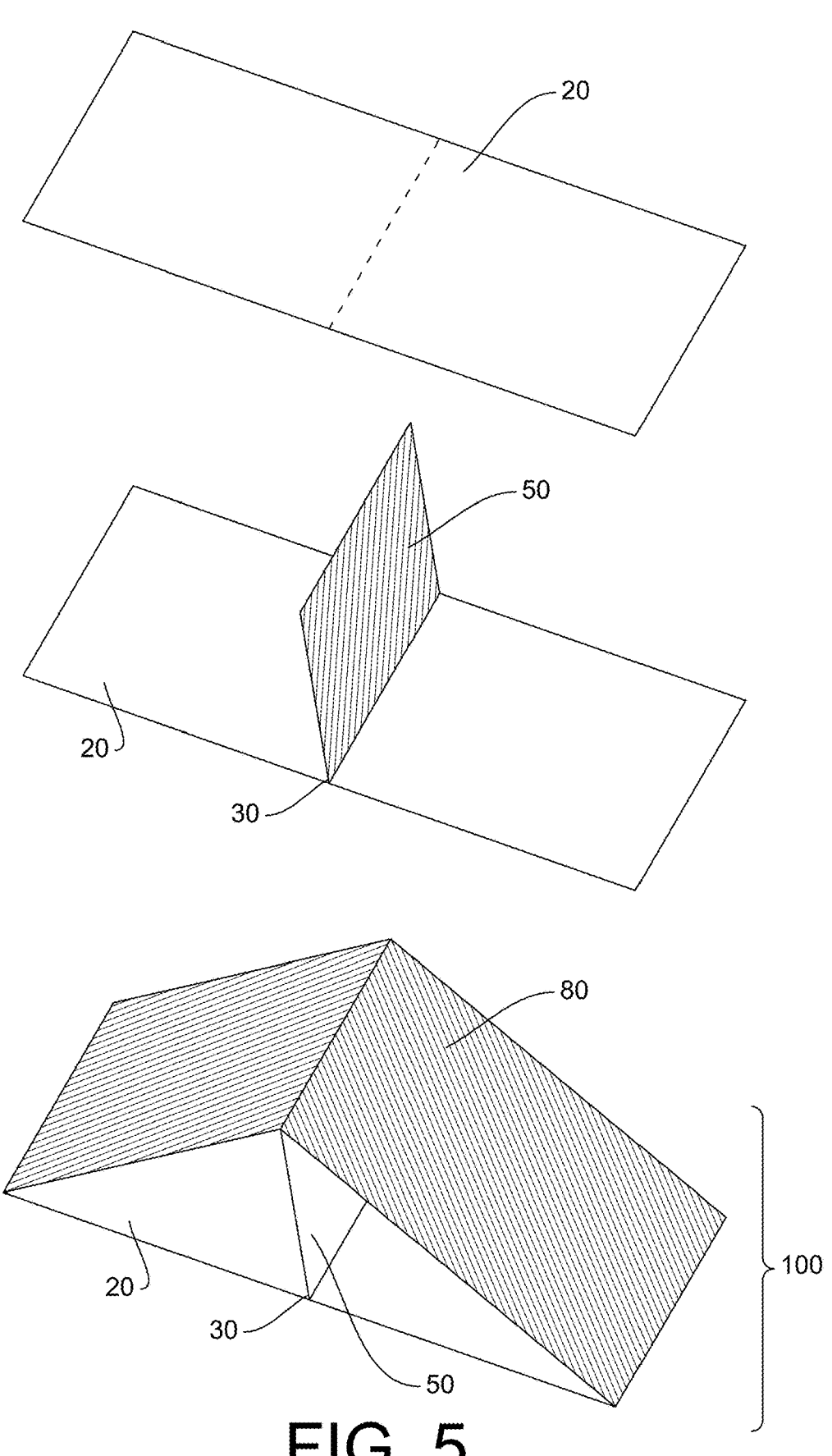
FIGS. 5 and 6A are diagrams illustrating overhead angular views of a method for building a modular roof truss unit according to one implementation.
Figures 6A, 6B:
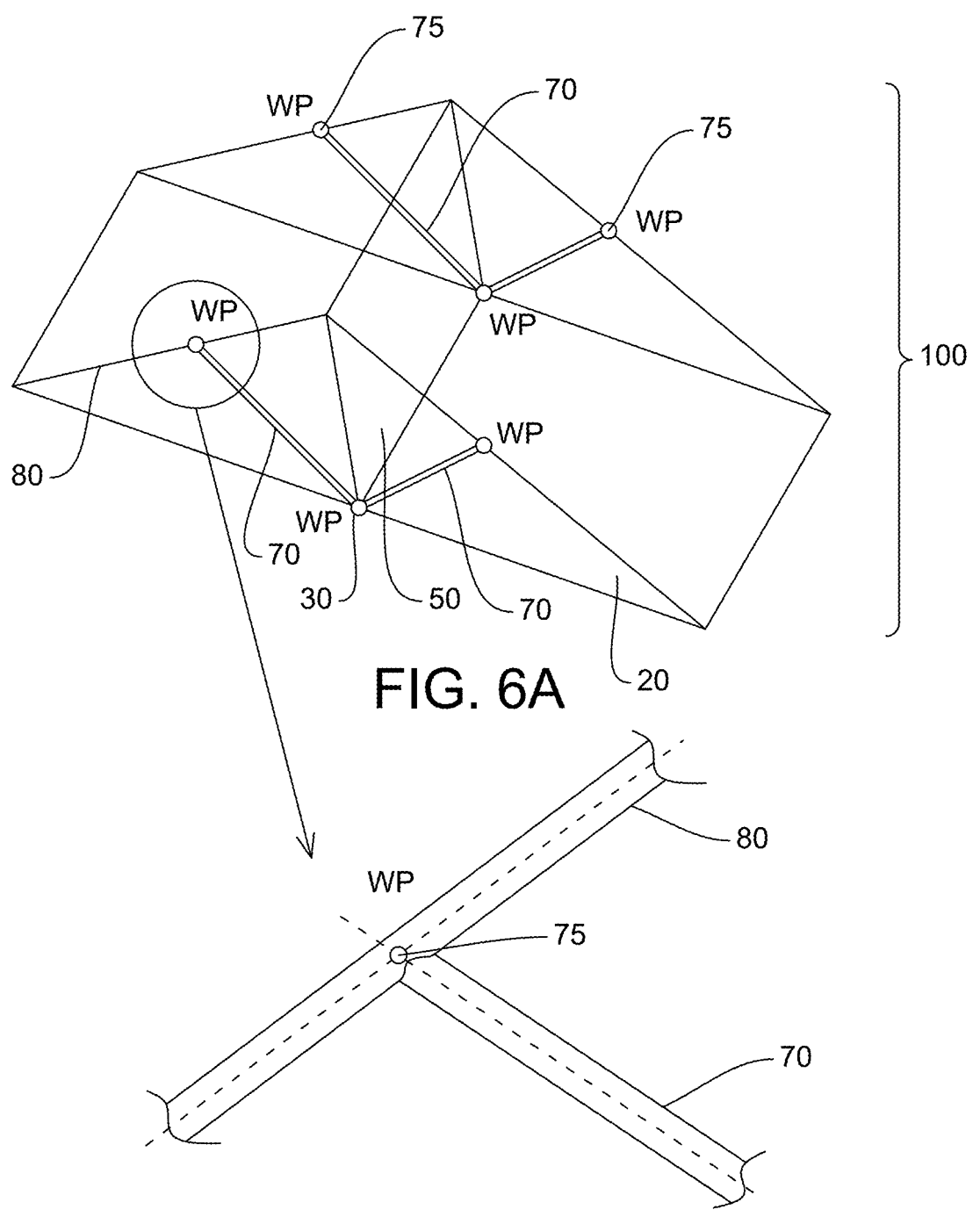
FIG. 6B is diagram illustrating a magnified view of a portion of FIG. 6A showing the junction between a support member and a sloped member at a work point.

One implementation of a method of manufacture of a roof truss is shown in FIGS. 5 and 6A and 6B. The method includes first assembling a ceiling panel 20 as a horizontal member. The ceiling panel 20 can be a single panel or can be made of multiple panels or planks. The ceiling panel is planar and rectangular. A next step provides for assembling a ridge panel 50 as a vertical member. The ridge panel 50 is assembled perpendicular to the ceiling panel 20 and bisects a length of the ceiling panel 20 forming a T-junction 30 with ceiling panel 20. A pair of roof panels 80 are then provided as the sloped members each roof panel extending from an end of the ceiling panel 20 to the top of the ridge panel 50. The roof panel 80 forms acute angles between ceiling panel 20 and ridge panels 50 when installed. Typical widths of the ceiling panel, ridge panel, and roof panel are 4 feet or multiples of 4 feet. The three dimensional truss unit 100 thus formed is dimensionally stable. Once this unit is assembled, webs 70 are installed as support members for reinforcement. As shown in FIG. 6A, two pairs of web planks 70 span outward from work points present at the base of the ridge panel on either side of T-junction 30 to work points 75 present in the roof panels 80. The two pairs of web planks 70 are shown on either longitudinal side of ceiling panel 20. As shown in FIG. 6B, the web planks 70 have precision cut ends shaped to fit at precision cut grooves at the work points 75 which supports price alignment at the work points 75 on the bottom side of the roof panel 80. The ends and grooves can take on various polygonal shapes such as triangular and square that lock or mate together.

Figure 7A:
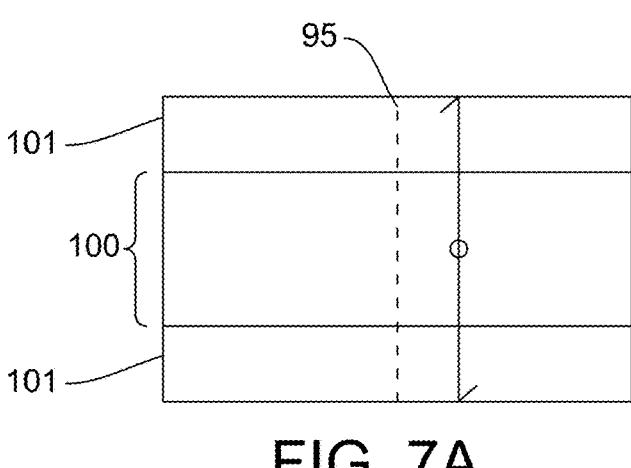
FIGS. 7A and 7B are diagrams illustrating top views of installation of modular roof truss units on a roof with flanking filler units according to different implementations.
Figure 7B:
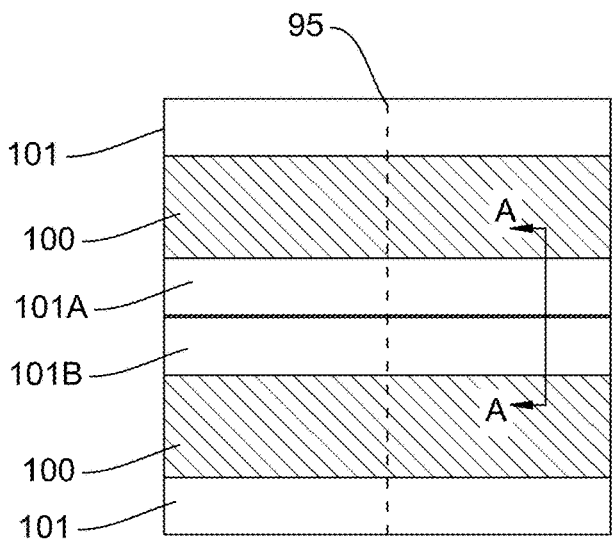
Figure 7C:
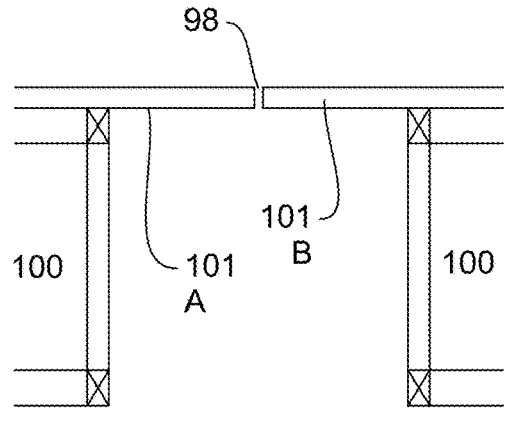
FIG. 7C is a diagram illustrating a section view of a portion of FIG. 7B.
Figure 8:
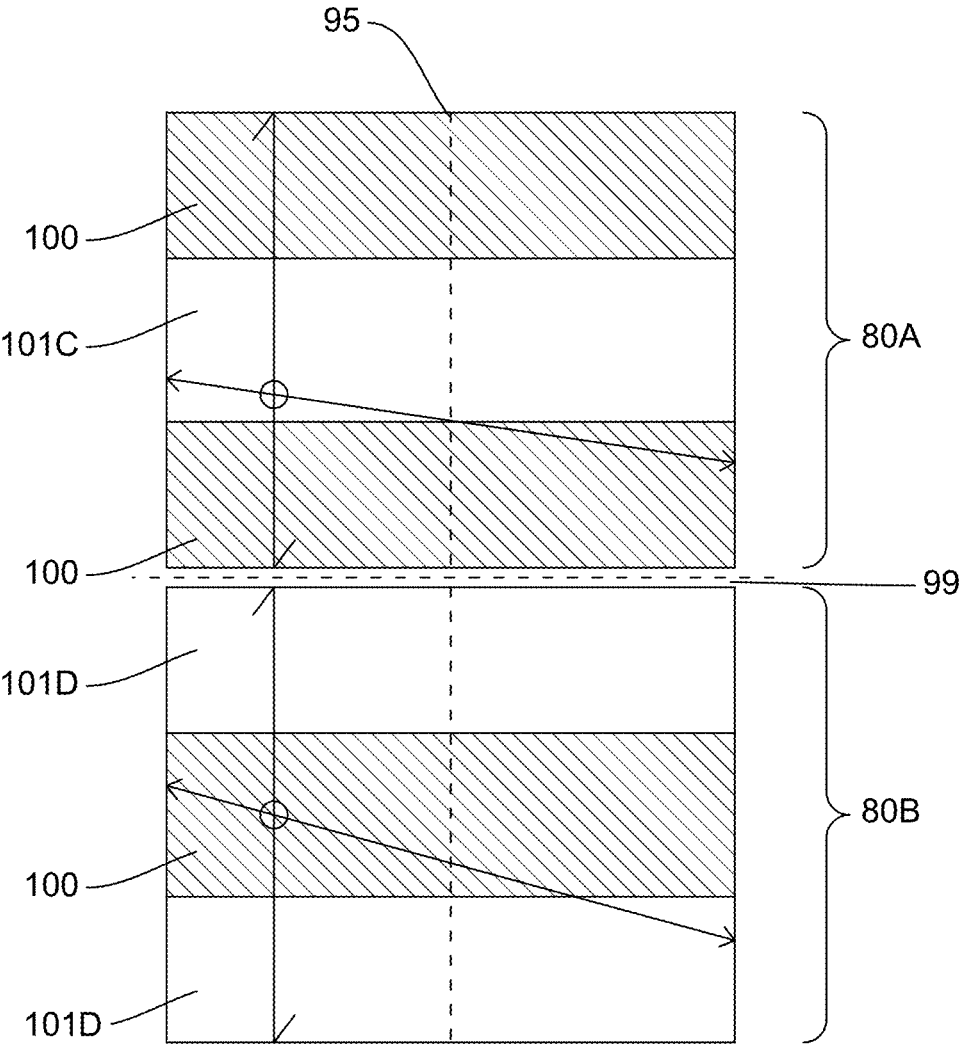
FIG. 8 is a diagram illustrating a top view of installation of modular roof truss units with flanking filler units on a roof with roof panels according to one implementation.
Figure 9A:
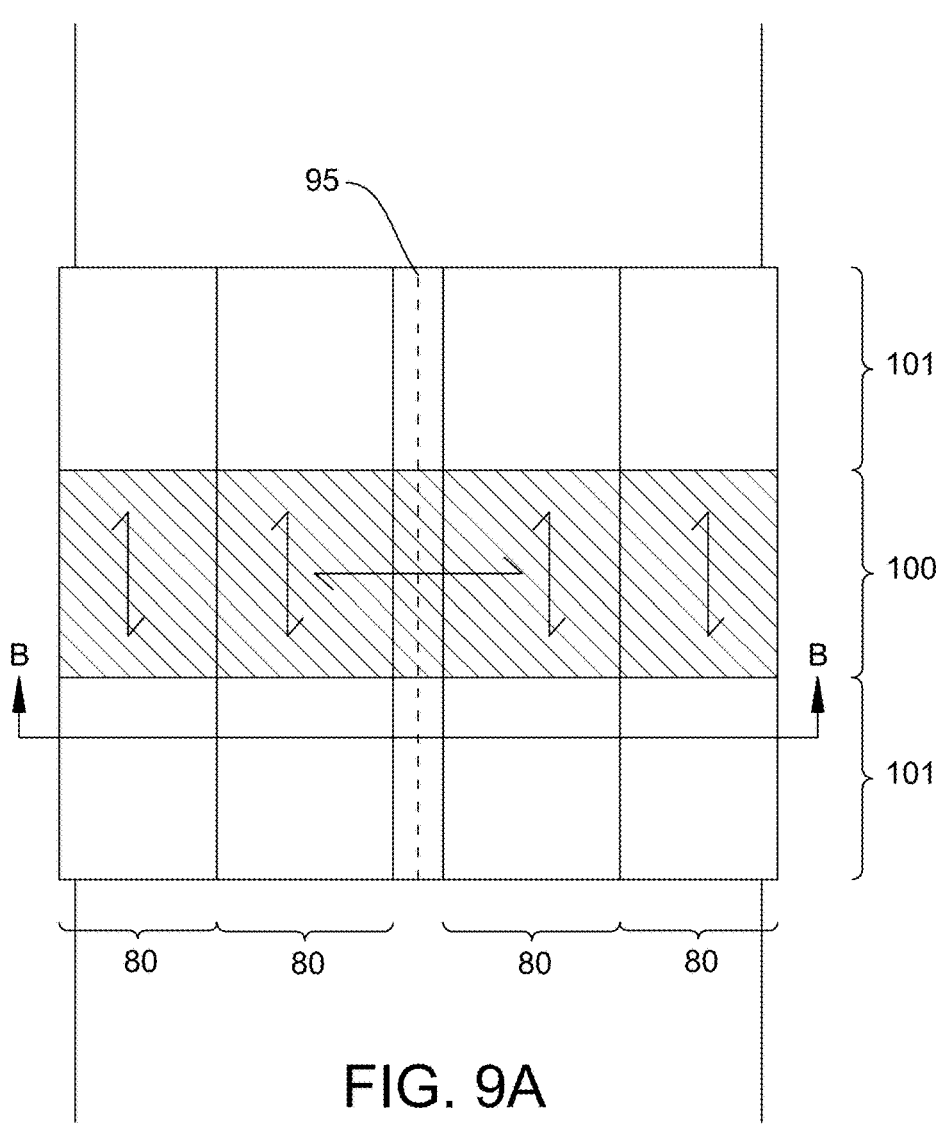
FIG. 9A is a diagram illustrating a top view of installation of a modular roof truss unit with flanking filler units on a roof with roof panels according to another implementation.
Figure 9B:
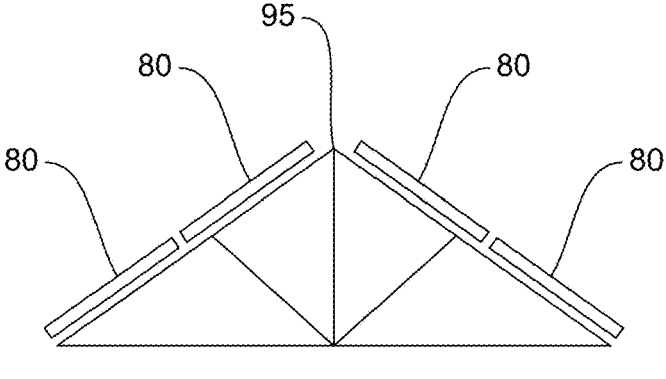
FIG. 9B is a diagram illustrating a section view of a portion of FIG. 9A.
Figure 10:
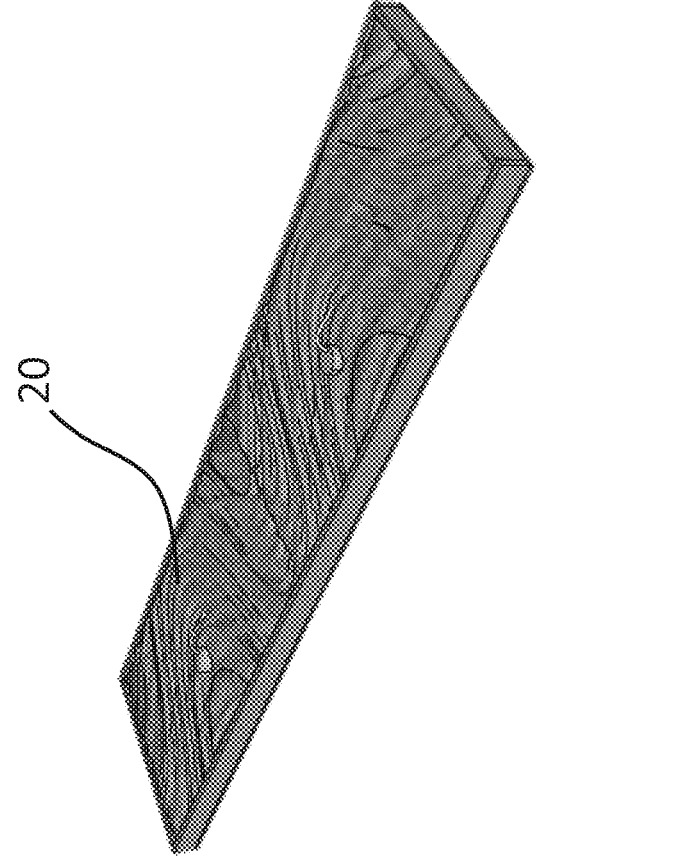
FIGS. 10-13 are diagrams illustrating angular views of a method for building a modular roof truss unit according to another implementation.
Figure 11:
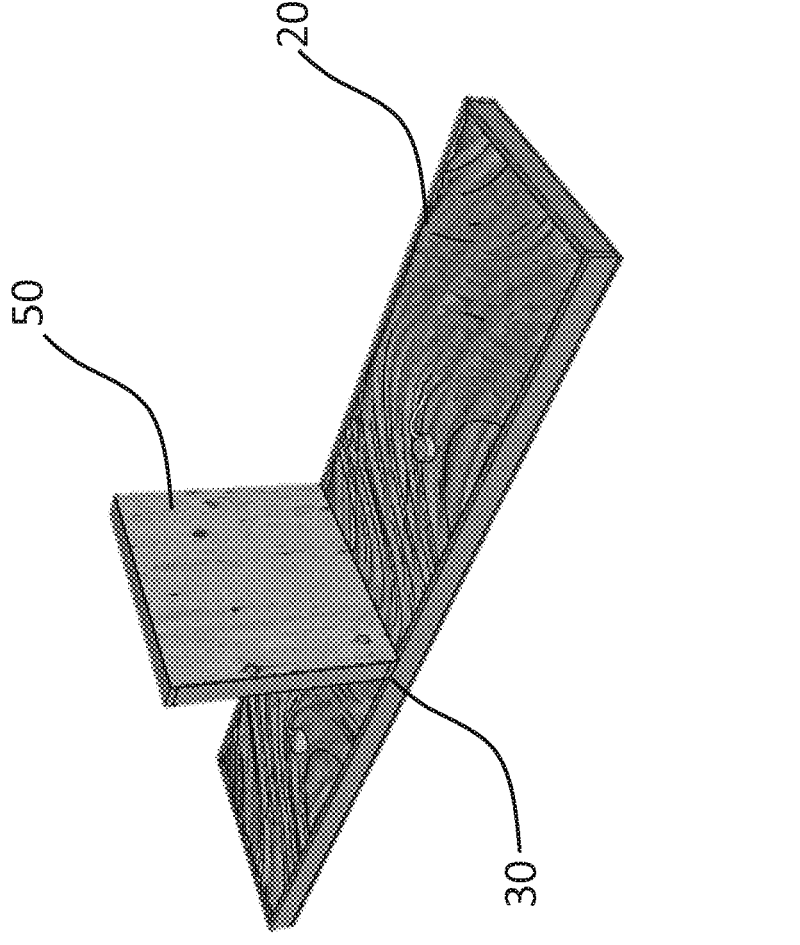
Figure 12:
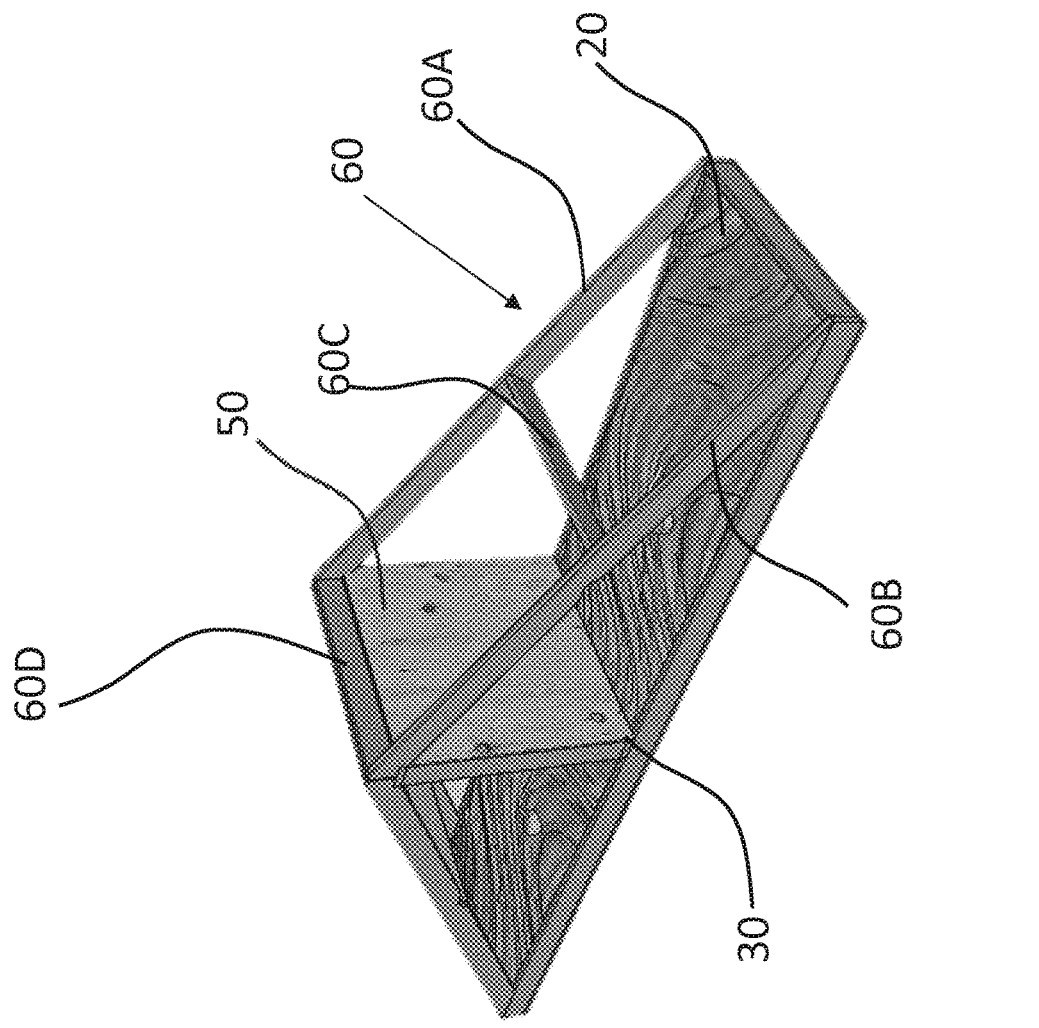

FIGS. 7A-7C, 8, and 9A and 9B illustrate ways in which the three dimensional truss units 100 assembled in FIGS. 5 and 6A and 6B can be installed as a component of a roof. The truss components 100 can be flanked by fillers 101 on either side of the truss components 100 as shown in FIG. 7A. The fillers 101 can be ceiling components or purlins interspersed between or flanking truss components 100. Typical widths of fillers can be 2 feet; thus a single roof unit can be 8 feet in width (4 feet width of truss component plus two flanking filler components) as a shippable unit. FIG. 7B shows a partial roof plan where adjacent fillers 101A and 101B in the center of a roof are joined together by a pinned connection 98 and shown in FIG. 7C. FIG. 8 shows a similar design where truss components 100 are interspersed with fillers such as spanning component 101C and cantilever components 101D. The roof includes two roof panels 80A and 80B overlaying the arrangements of alternating truss units and fillers spanning the length of the roof and connected together at a joint 99. In this case, both the trusses and fillers are four feet in width. Thus, roof panel 80A covers spanning component 101C flanked by two truss units 100 and is 12 feet in length with variable width, while roof panel 80B covers truss component 100 flanked by two cantilever components 101D and is also 12 feet in length and variable width. FIGS. 9A and 9B show an alternate arrangement where four roof panels 80 span the length of the roof in parallel, with two on either side of the ridge line 95. A single truss component 100 is flanked by two filler components 101.

Figure 13:
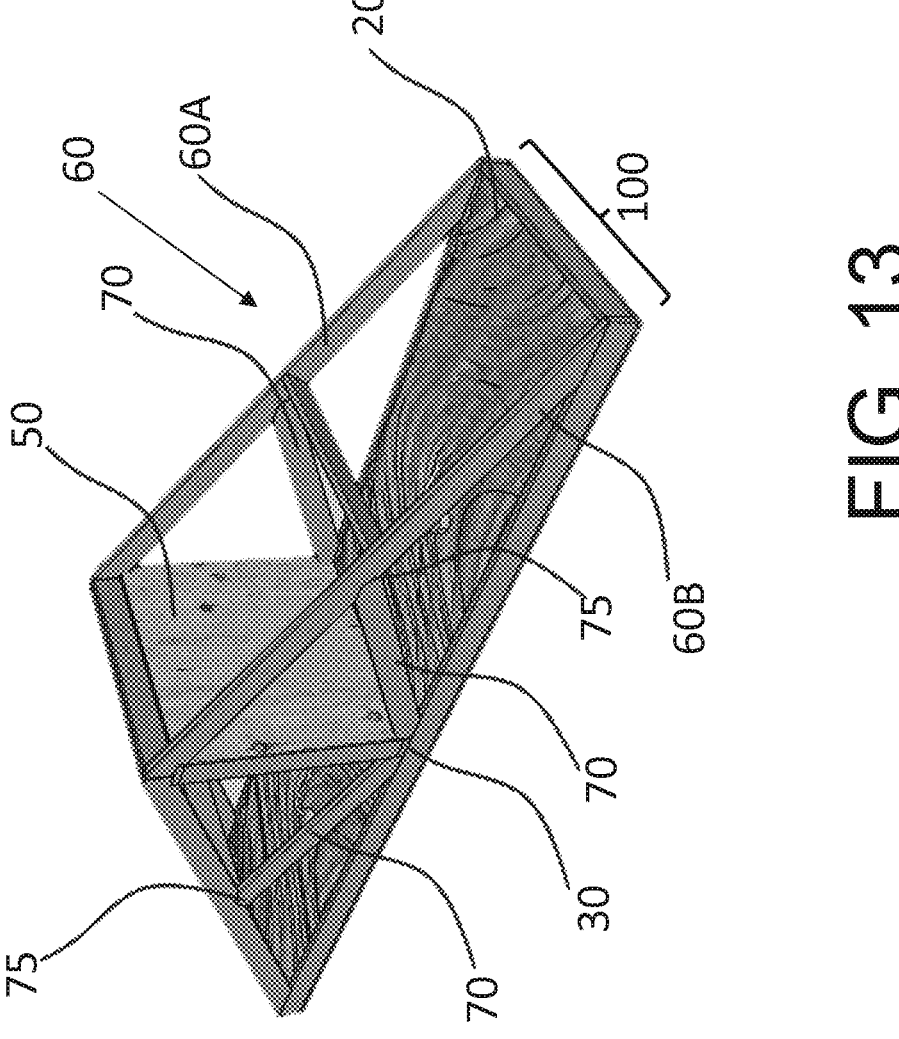

FIGS. 10-13 illustrate the construction of a truss component 100 according to another implementation. The truss component 100 is assembled in the same manner as shown in FIGS. 5 and 6A and 6B, with ceiling panel 20 serving as the horizontal member or foundation of the truss component, and a ridge panel 50 bisecting the ceiling panel 20 longitudinally to serve as the vertical member and forming a T-junction 30 with ceiling panel 20. In this instance, the ridge panel supports a frame assembly 60 as the sloped member instead of a roof panel. The frame assembly 60 is designed as an A-frame having two pairs of sloped planks 60A and 60B joining the end of the ceiling panel 20 to the top of the ridge panel 50 to form acute angles therebetween, the sloped planks 60A and 60B joined across together by horizontal struts 60C and 60D. FIG. 13 illustrates that support member webs 70 join sloped beams 60A and 60B on either side of truss component 100 from work points at the bottom of the ridge panel 50 at T-junction 30 of ridge panel 50 and ceiling panel 20 to work points 75 on mid-portions or centers on undersides of the sloped beams 60A and 60B. The finished truss unit 100 is the basic building block that is assembled on the ground of a construction site. Once built it is lifted into place with a crane on the roof a house under construction. The rigid structure formed has the advantage that it is easier to handle and more stable compared to the prior art planar and flexible truss structures shown in FIGS. 1-4.

Figure 14:
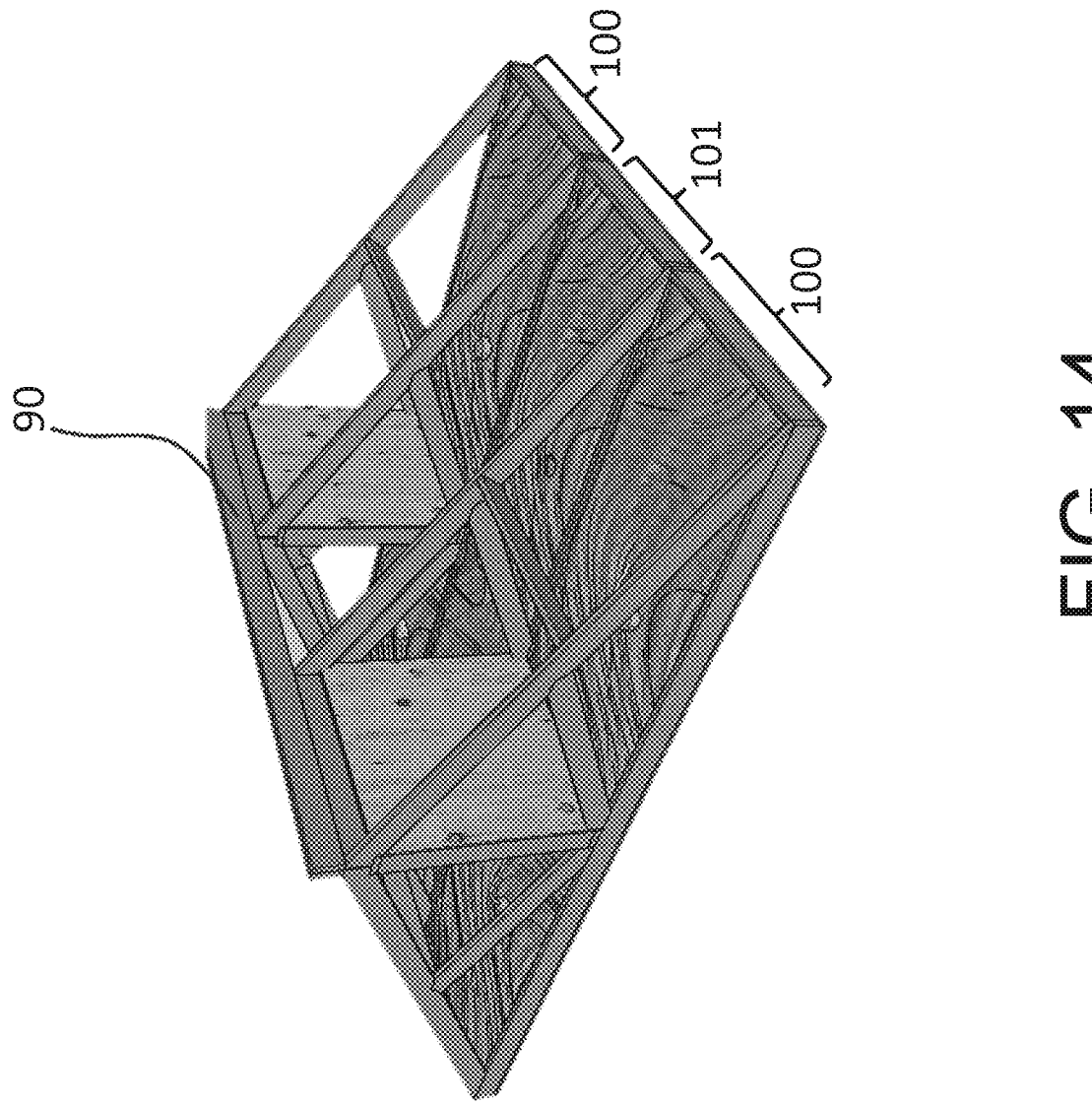
FIGS. 14 and 15 are diagrams illustrating angular views of installation of modular roof truss units on a roof (FIG. 14) with overlying roof assembly (FIG. 15) according to another implementation.
Figure 15:
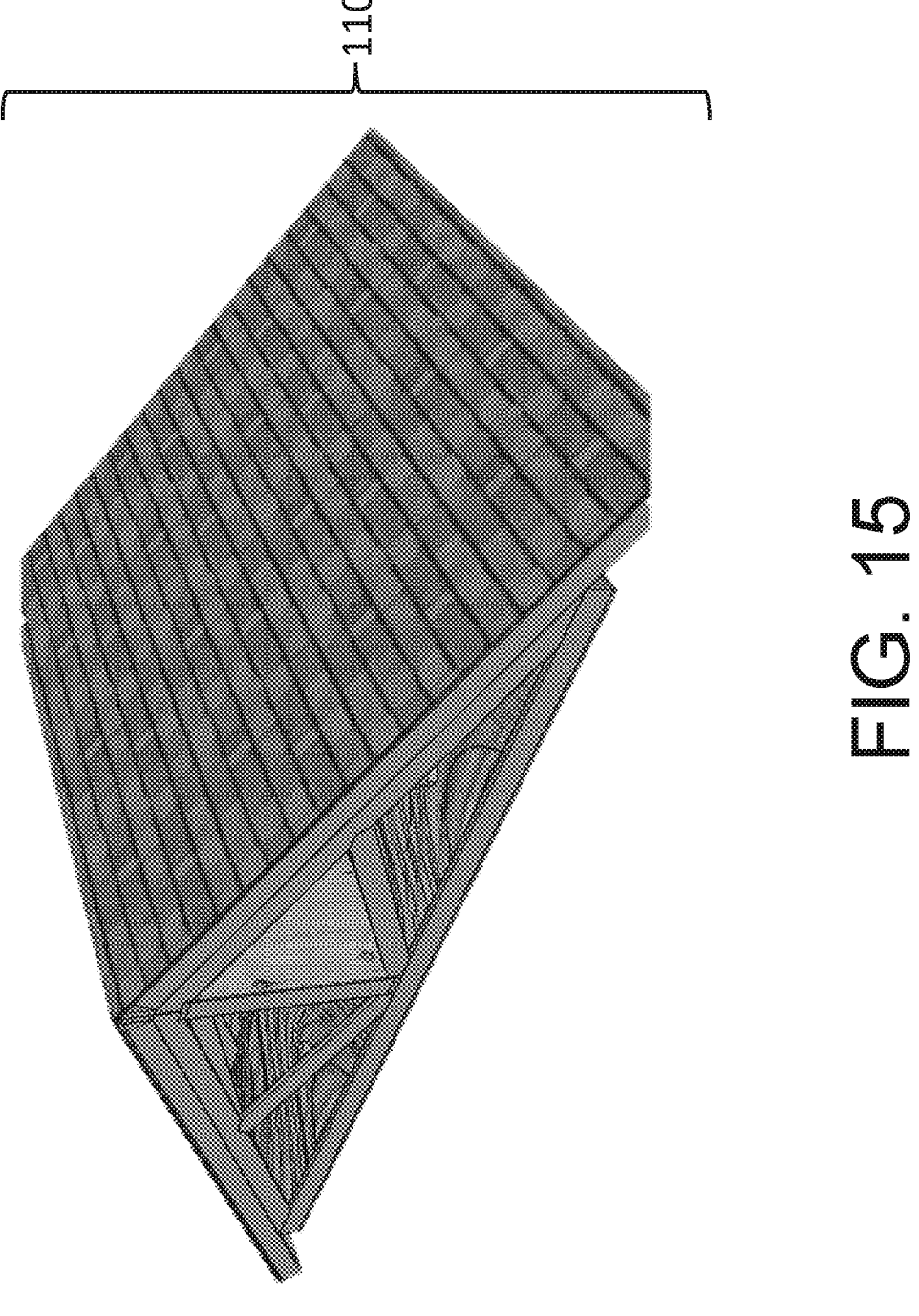
Figure 16:
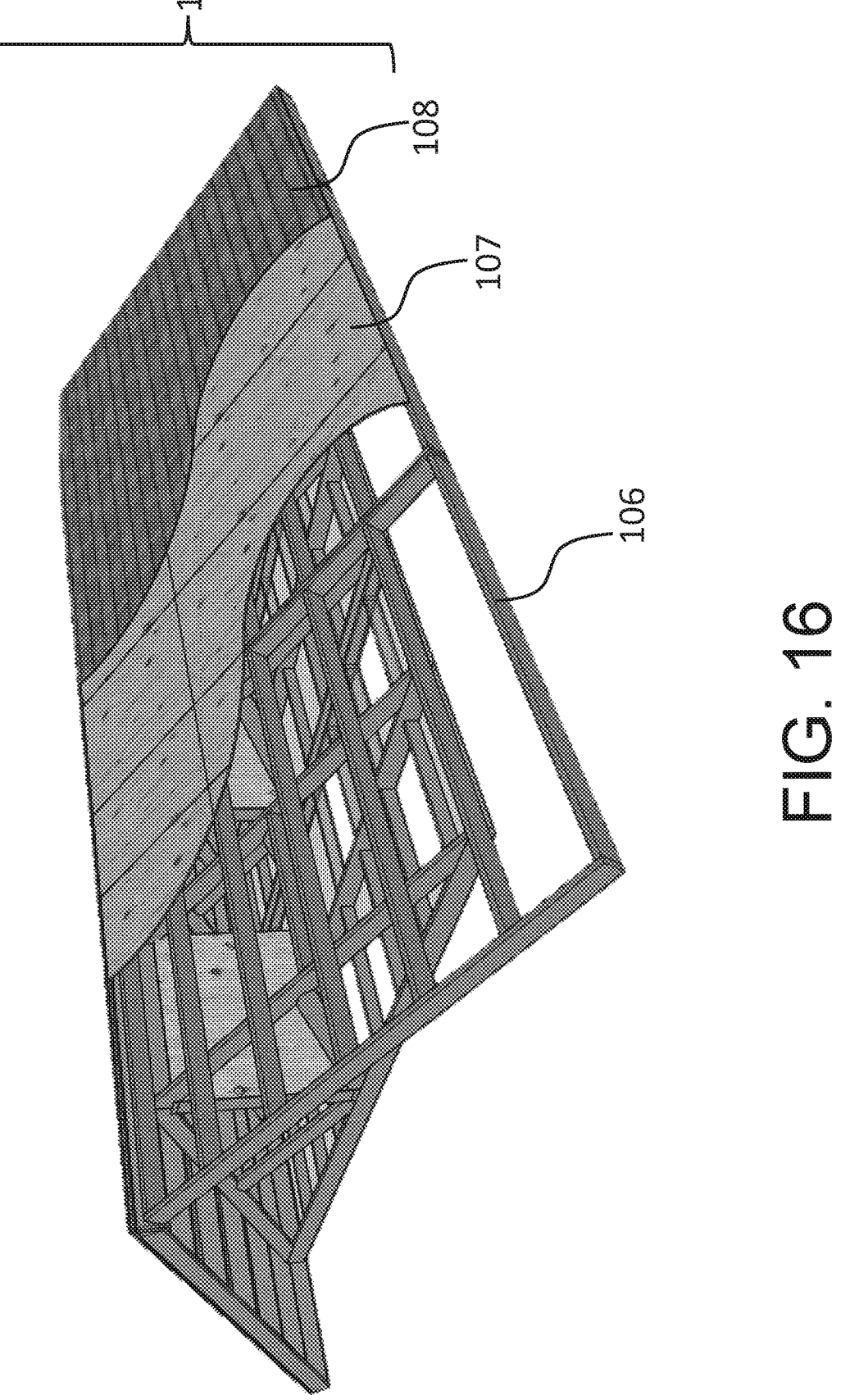
FIGS. 16-19 are diagrams illustrating completed roof assemblies, with FIGS. 16 and 17 showing angular views, FIG. 18 showing a top view, and FIG. 19 showing a bottom view.
Figure 17:
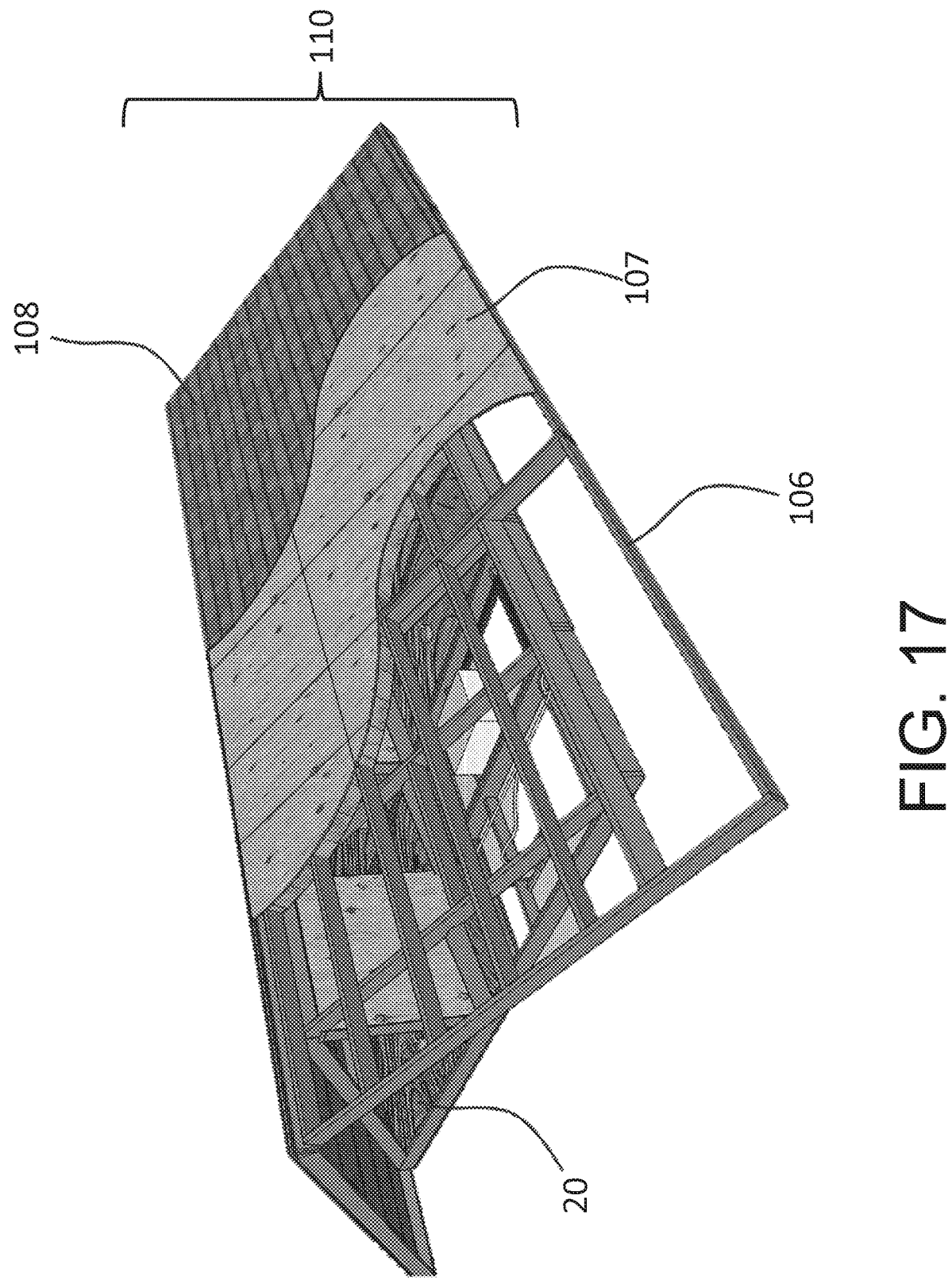
Figure 18:
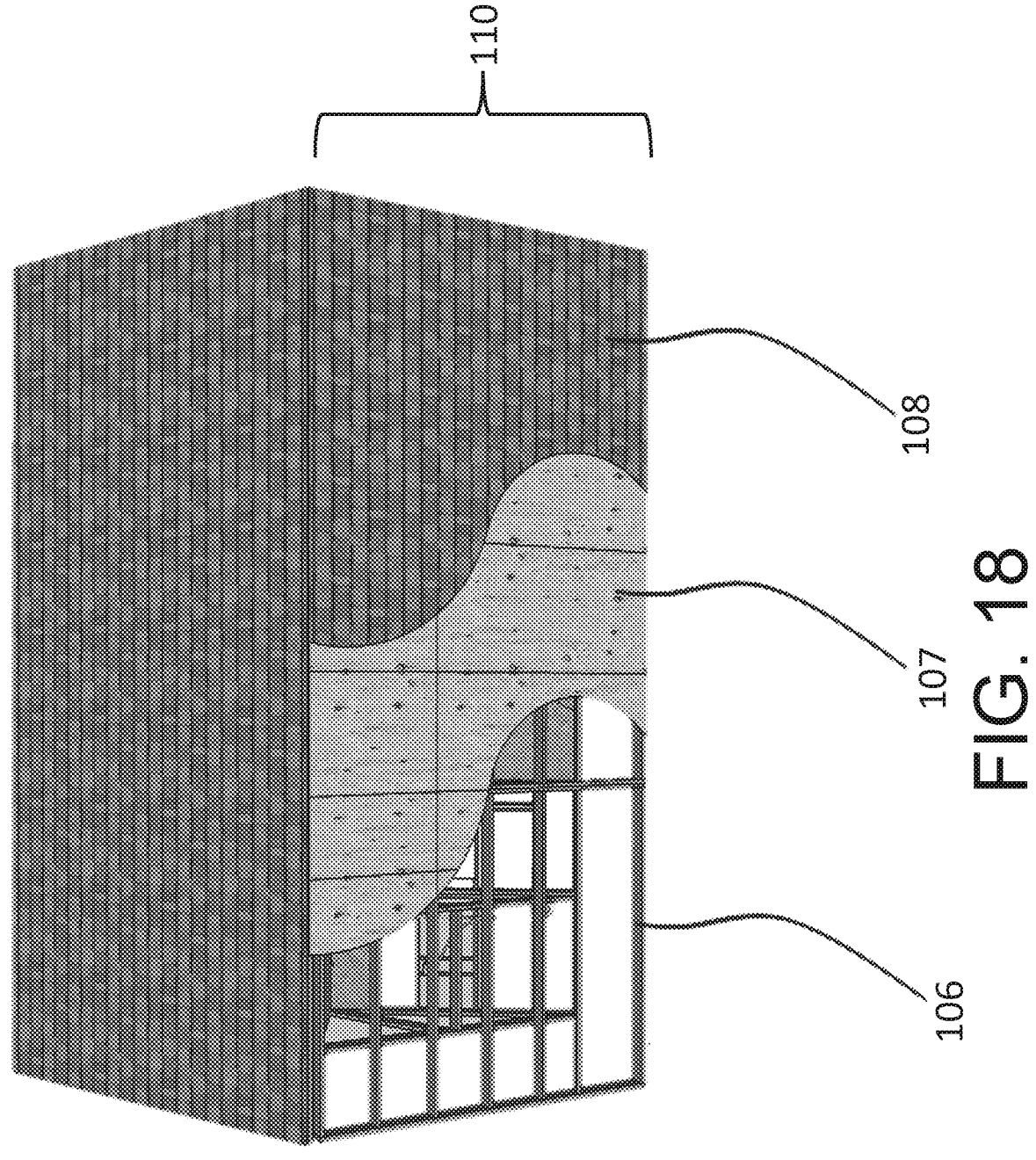
Figure 19:
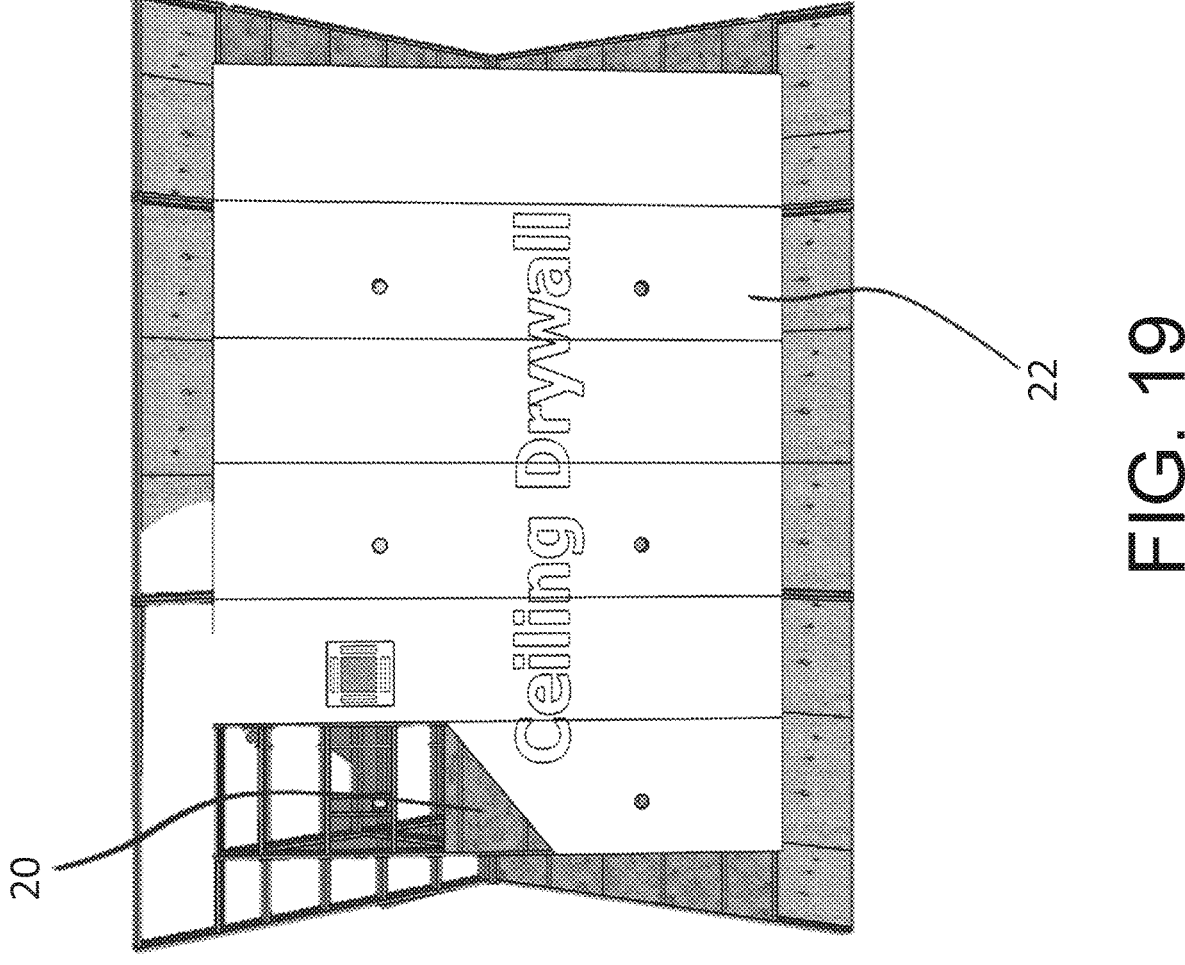

FIG. 14 shows truss components 100 interspersed with filler component 101 which in this instance is a ceiling panel. A single beam 90 connects and spans truss components 100 and filler component 101 to form a ridge. FIG. 15-18 show roof unit 110 installed above truss components. Roof unit 110 consists of frame 106, roof boards 107, and roofing material 108 such as singles. FIG. 19 shows a bottom perspective where ceiling drywall 22 below the roof is installed underneath ceiling panels 20.

Figure 20:
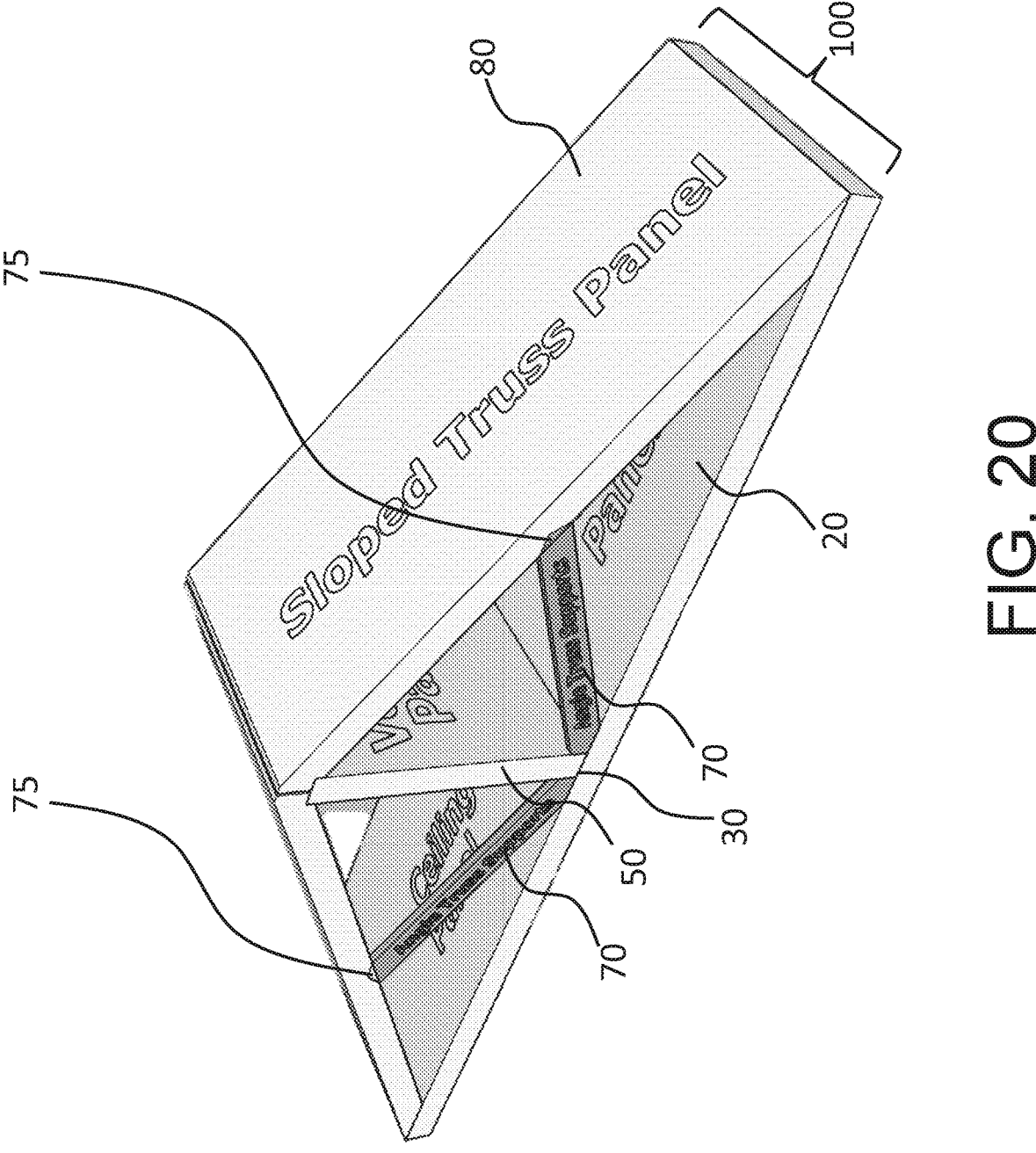
FIGS. 20-22 are diagrams illustrating additional implementations of modular roof truss unit construction, with FIG. 20 showing an angular view, FIG. 21 showing a front view, and FIG. 22 showing a top view.
Figure 21:
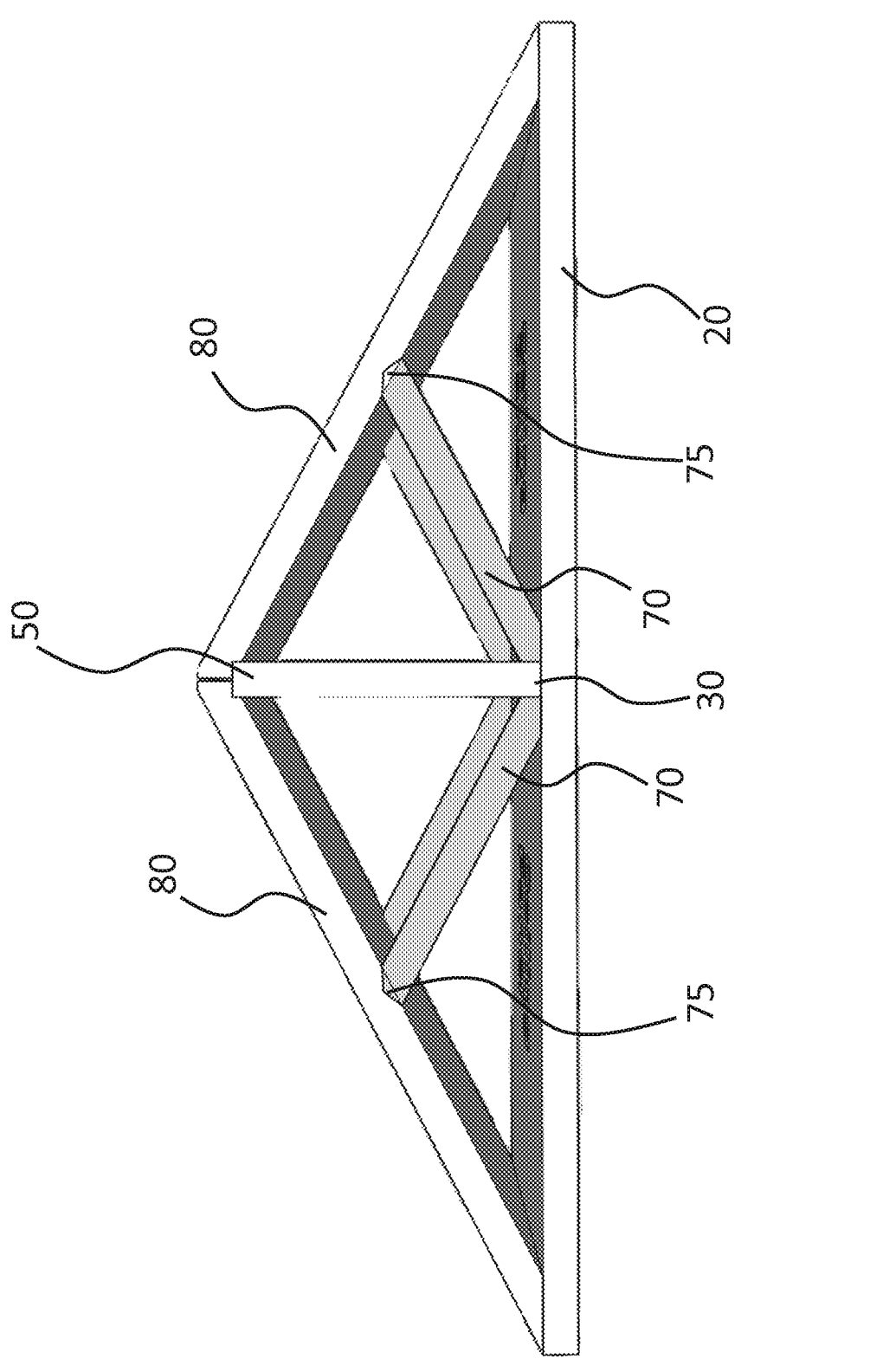
Figure 22:
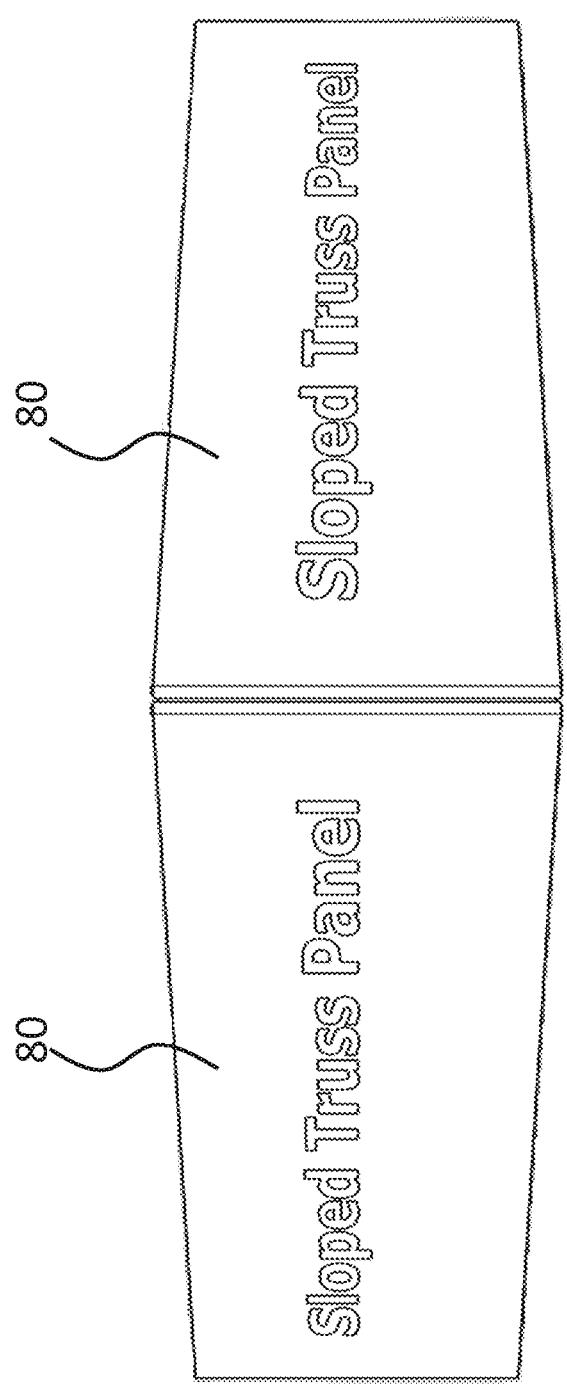
Figure 23:
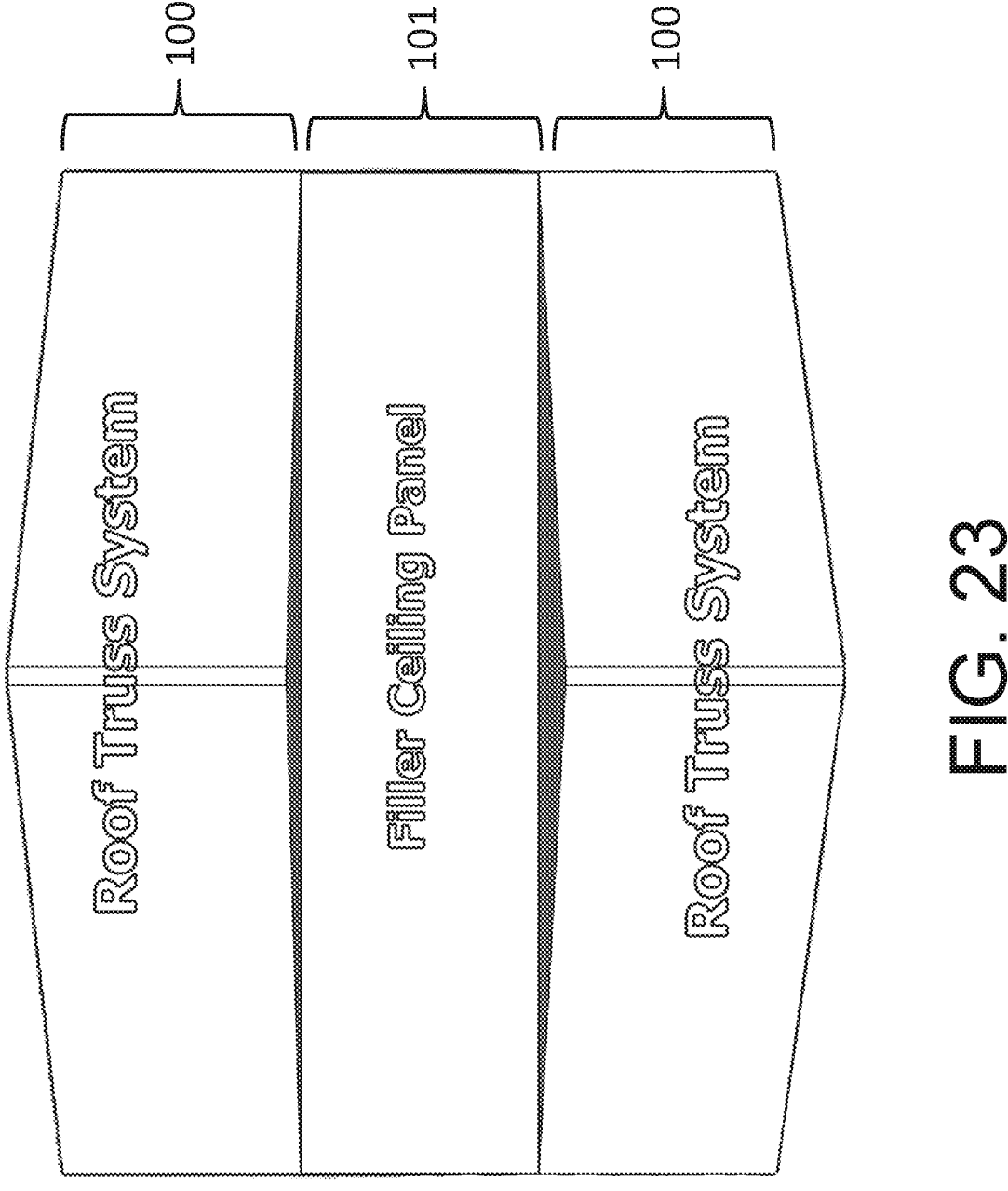
FIGS. 23 and 24 are diagrams illustrating installation of modular roof truss units according to one implementation, with FIG. 23 providing a top view and FIG. 24 providing an angular view with overlying roof panel.
Figure 24:
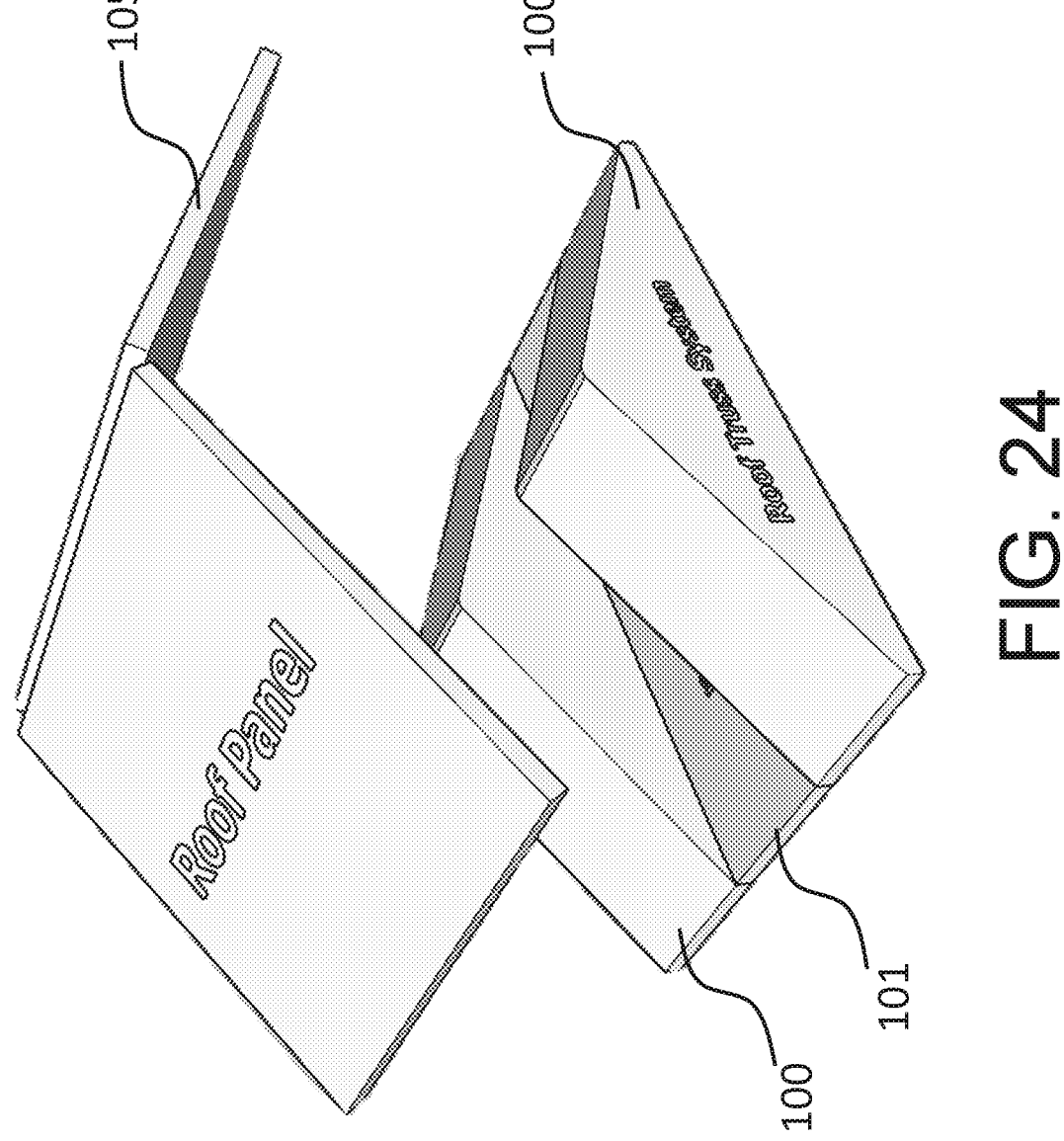

FIGS. 20-22 provide additional illustrations of completed truss units 100 where horizontal member ceiling panel 20 is bisected by vertical member panel 50 to form a T at their junction 30, with sloped member truss panels 80 spanning from opposed ends of ceiling panel 20 and at rest upon top of vertical panel 50, where acute angles are formed between sloped truss panel 80 and vertical panel 50 and sloped truss panel 80 and ceiling panel 20. Angled truss support members or web beams 70 span from work points at bottom of vertical panel 50 at their junction 30 with ceiling panel 20 to midportion of sloped truss panel 80 at work points 75 on an underside of the sloped truss panels 80.

Figure 28:
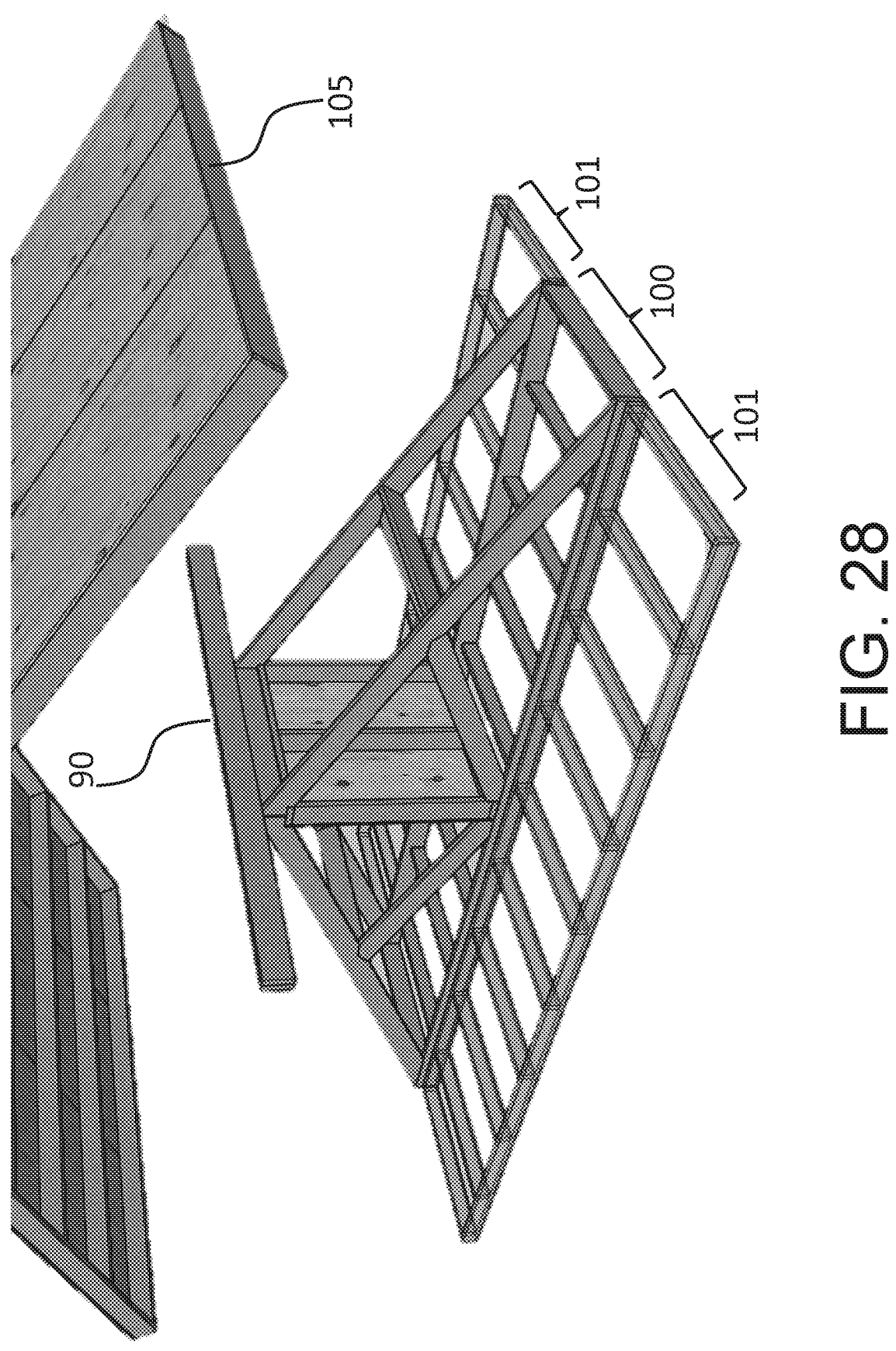

FIGS. 23-27 illustrate arrangements of truss components 100 and filler components 101, where filler ceiling panel 101 is flanked by roof truss components 100 on either side of ceiling panel 101 to support an overlying roof panel 105 that is supported by ridge plank 90 spanning roof truss components 100 and width of filler ceiling panel 101 therebetween. FIG. 28 shows an alternative embodiment where truss component 101 is flanked by ceiling panel filler components 101. A single ridge plank or beam 90 spanning truss component 100 and flanking filler components 101 provides a ridge or support for overlying roof panel 105.

Figure 29:
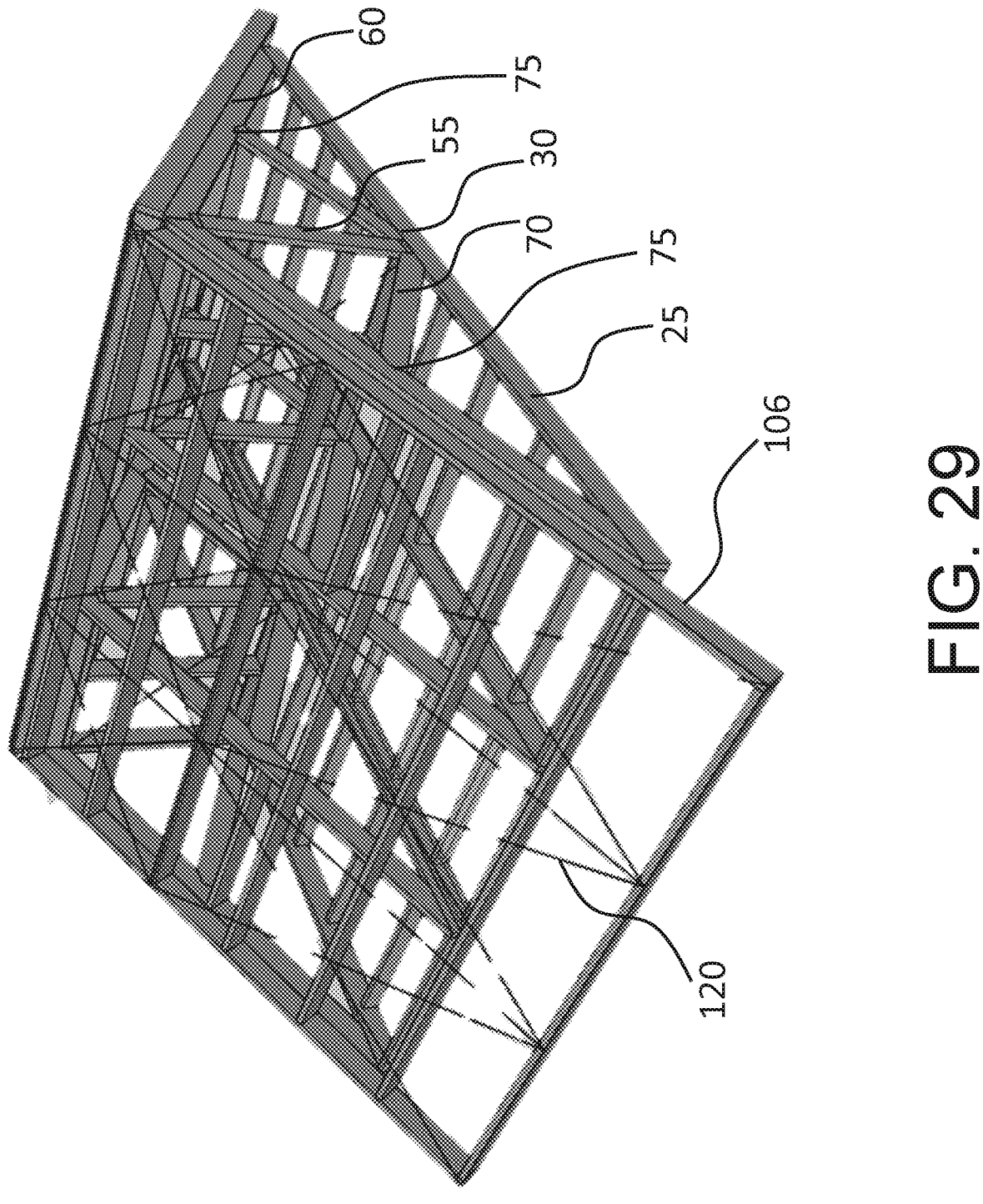
FIGS. 29-31 are diagrams illustrating installation of modular roof truss units and overlying roof assembly according to another implementation, with FIGS. 29 and 30 providing angular views and FIG. 31 providing a front view.
Figure 30:
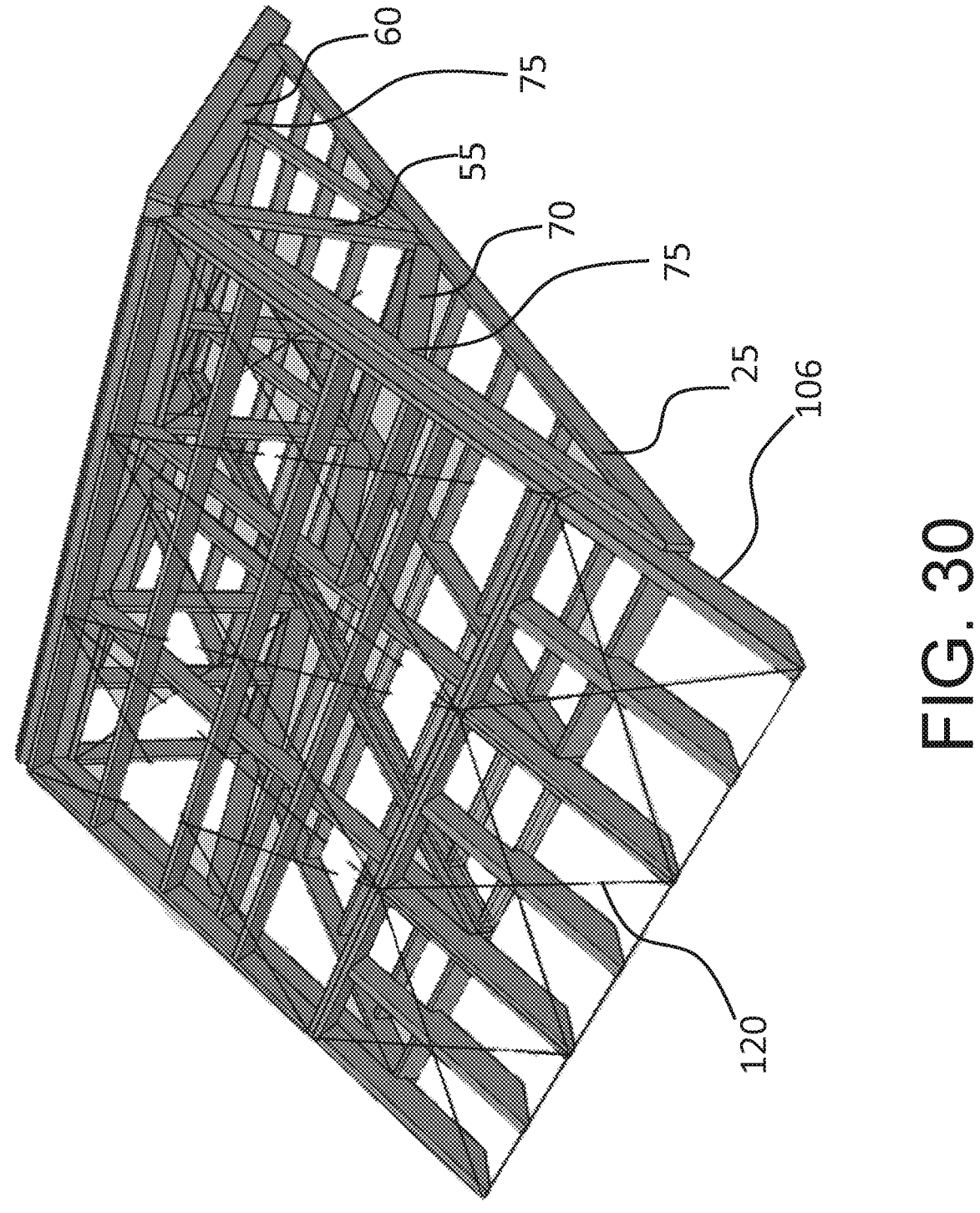
Figure 31:
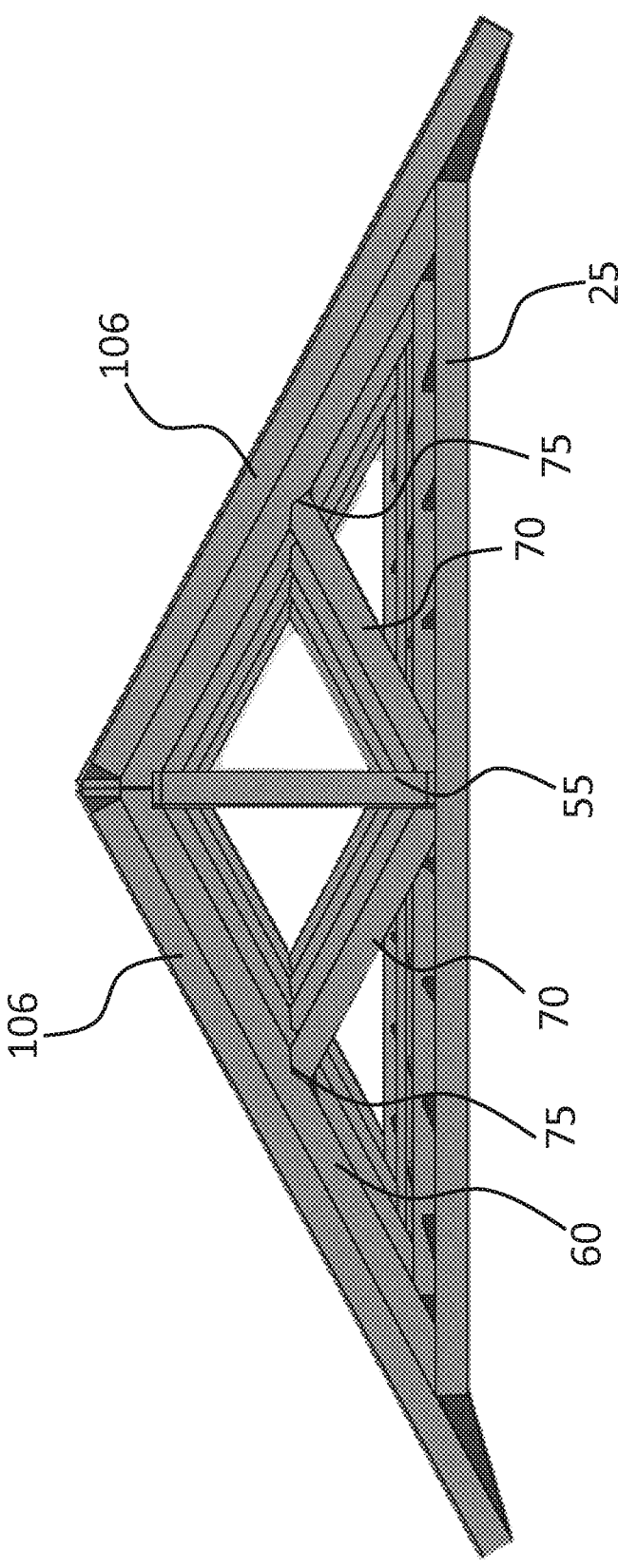

FIGS. 29-31 illustrate an alternate embodiment where vertical beams 55 replace vertical panels as the vertical members in truss construction. The vertical beams 55 bisect horizontal member ceiling frame component 25 at T-junction 30 to support sloped frame members 60 of A-frame. Web beams 70 serves as support members to connect and support from work points at bottom of vertical beams 55 at T-junction 30 with ceiling frame component 25 to underlying work points 75 at midportion of sloped members 60. Overlying top of A-frame 60 is roofing frame 106 which members are compressed together from web of wiring or twine 120 which binds the roofing frame together.

The horizontal members, vertical members, sloped members, and support members have an additional advantage in that they can be installed as prefabricated modular components. The prefabricated modular components can be dimensioned such that they can be stacked together in a planar orientation in parallel to each other and shipped by shipping containers that are used in an intermodal transport network which includes shipping, rail, and trucking. The prefabricated components can be transported by modified shipping containers. The modified shipping containers can be containers such as those described in U.S. patent Ser. No. 11/801,990 B2, issued Oct. 31, 2023, which is hereby incorporated by reference in its entirety. The modified shipping container can include a container bottom, two container sides and a container end in communication with the container bottom, a first container opening opposing the container end providing access to a container interior from a front of the container, one or more doors at the first container opening configured to facilitate front loading of the container when open, and seal the first container opening when closed, and a second container opening providing access to the container interior from the top of the container. The modified container can include a removable header system for a shipping container. The removable header system can include a header having a header bore therethrough, a frame having a structure extending outward from the frame and capable of supporting the header, a flange attached to a support, the flange having a flange bore therethrough and in alignment with the header bore, a pin designed to pass through the header bore and flange bore, and a clip designed to attach at an end of the pin on a side of the header opposing the flange which locks the pin in place when the header is attached to the shipping container. The removable header system can further include a tether attached to the pin at one end and attached to the support at an opposing end. The modified shipping container can further include a removable cover for a shipping container. The removable cover can include a rectangular piece of flexible polymeric material dimensioned to cover the top of the shipping container, the flexible polymeric material including a portion which extends over a top portion of one or more sides of the shipping container during use, a strip or margin of material attached to the portion of polymeric material, and a plurality of rings attached to the strip or margin of fabric. The removeable cover can be attached to the modified shipping container by way of a rope that passes through the plurality of rings that is secured to hooks on the container body.

Figure 25:
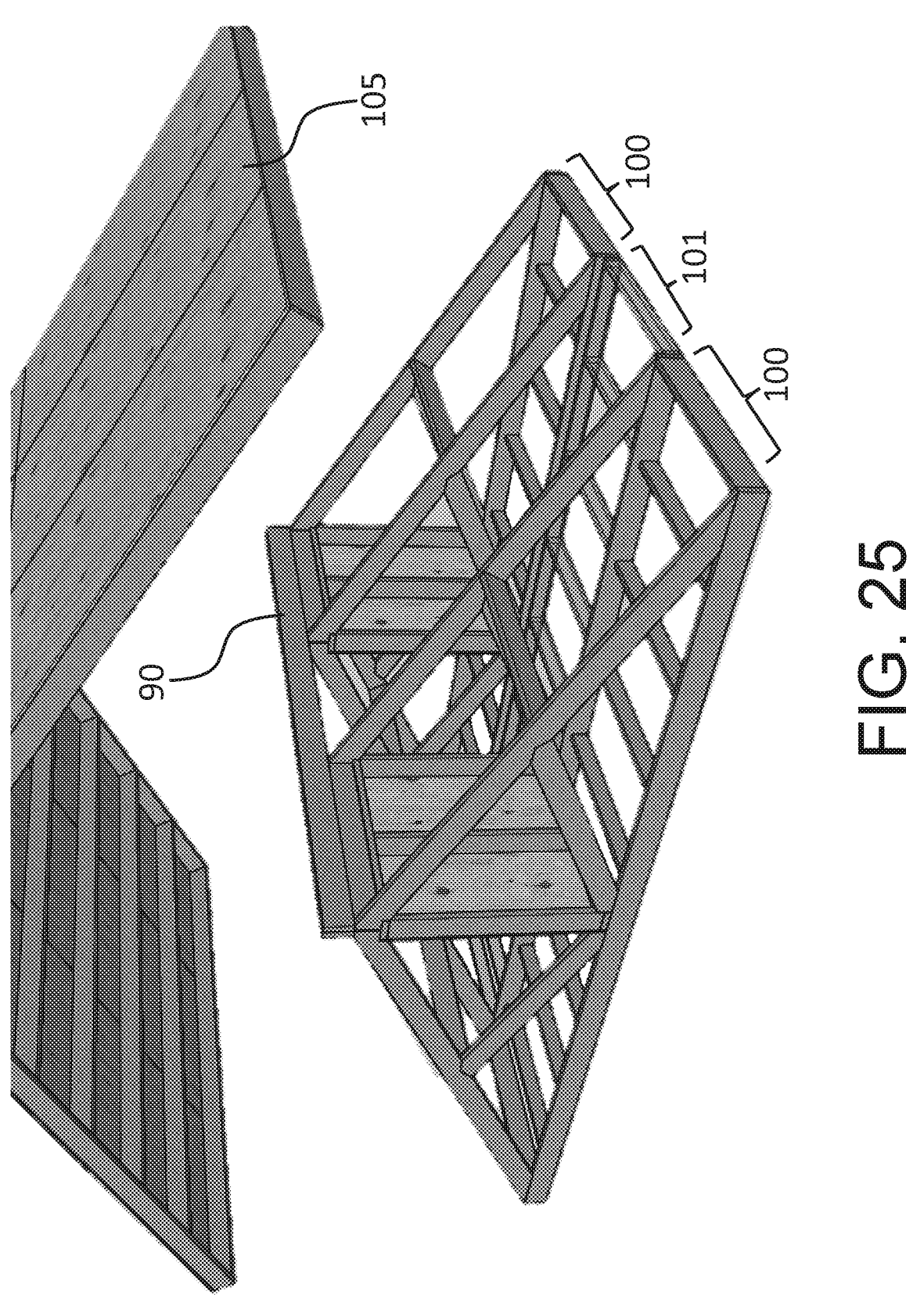
FIGS. 25-28 are diagrams illustrating installation of modular roof truss units to support a roof assembly according to another implementation, with FIGS. 25, 27, and 28 providing angular views and FIG. 26 providing a front view.
Figure 26:
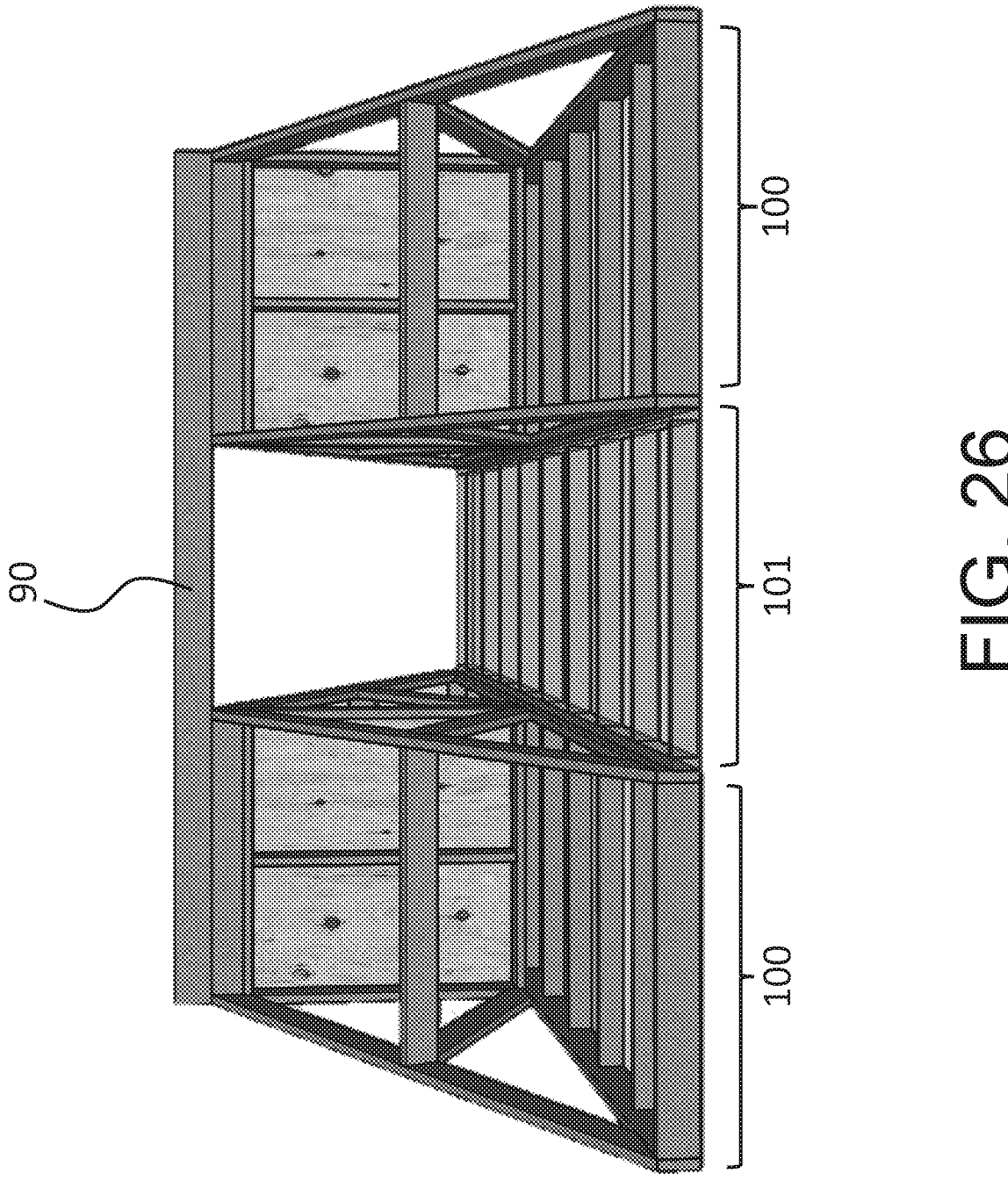
Figure 27:
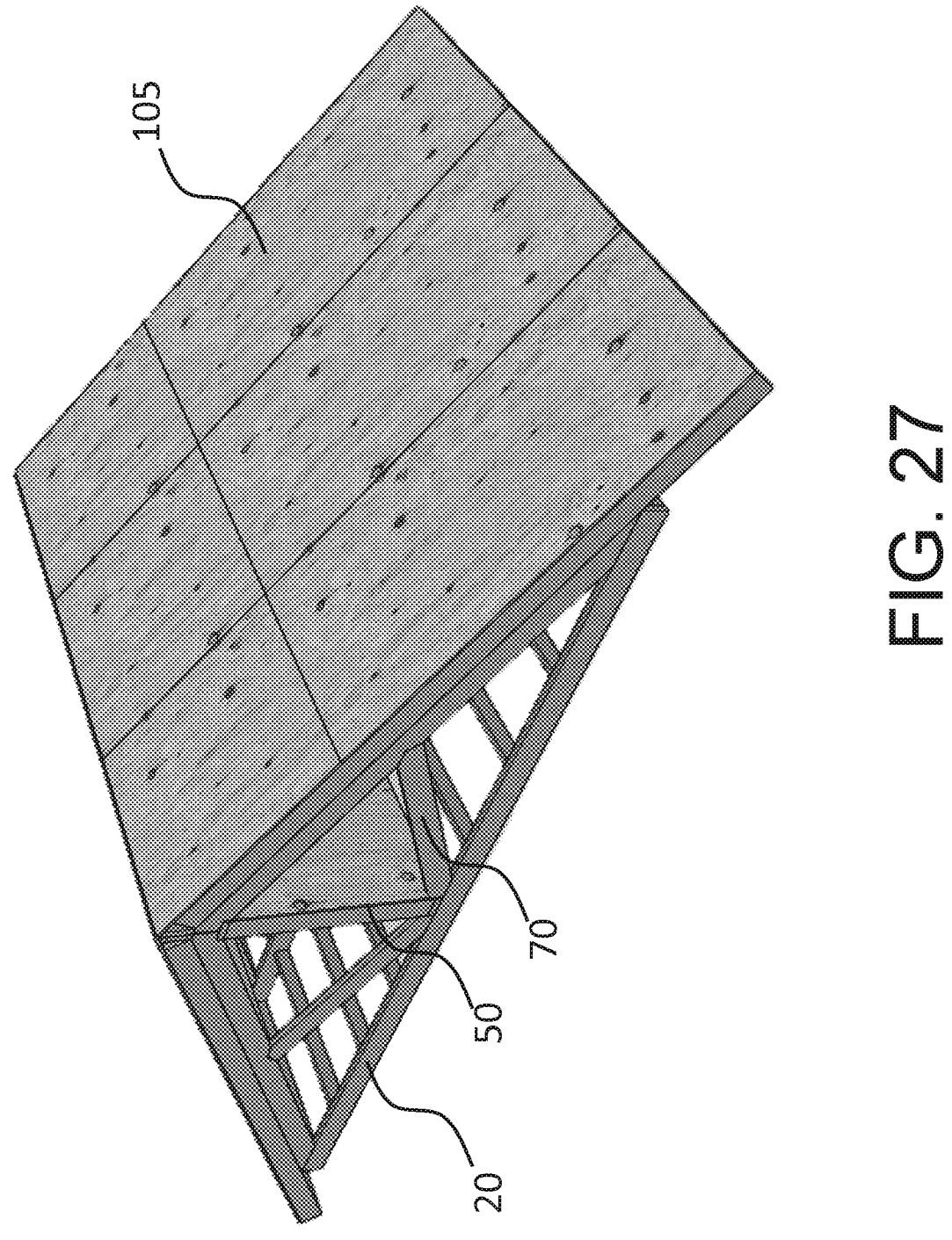
Figure 32:
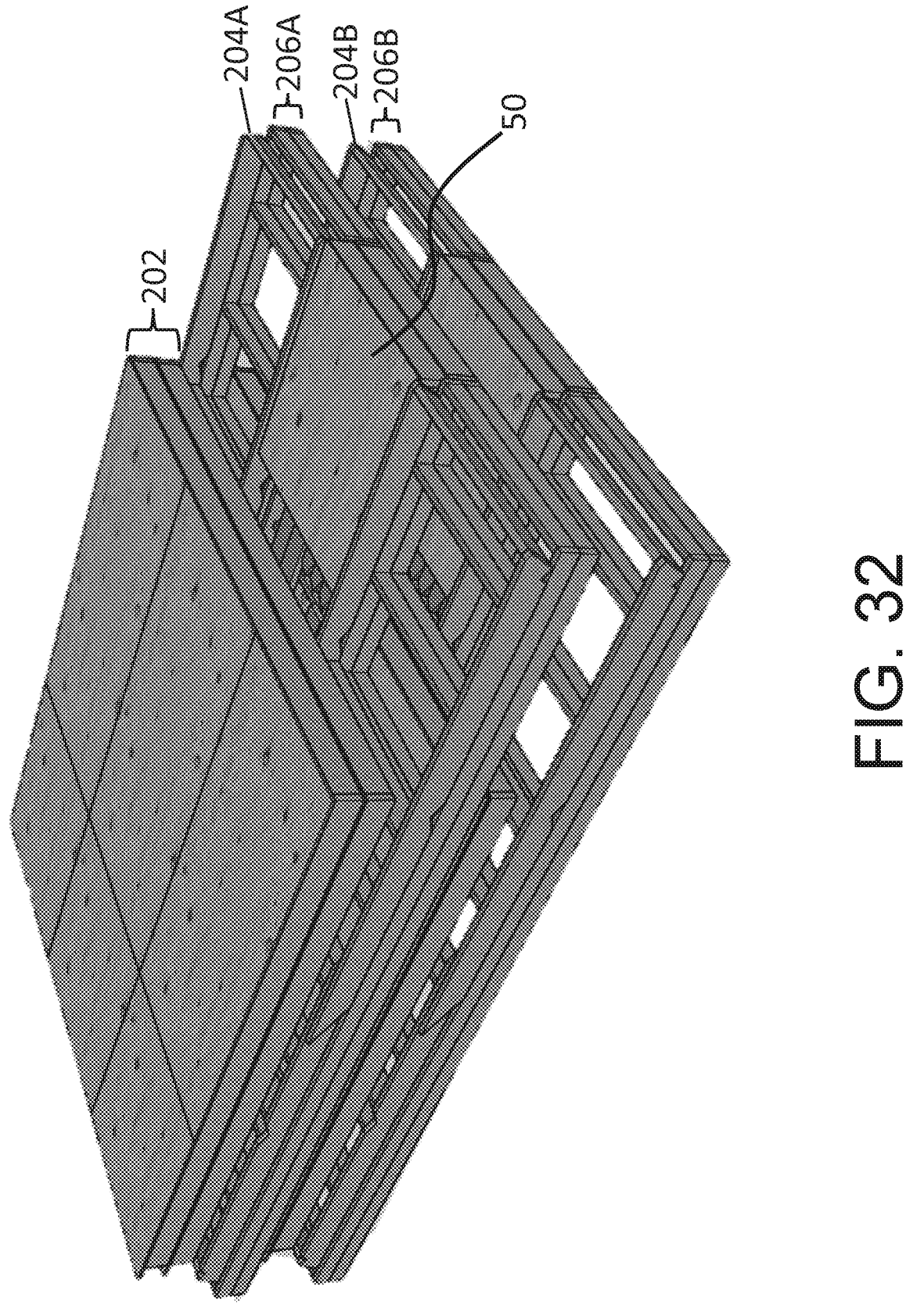
FIGS. 32-37 are diagrams illustrating prefabricated roof truss components stacked in parallel planar orientation for shipping.
Figure 33:
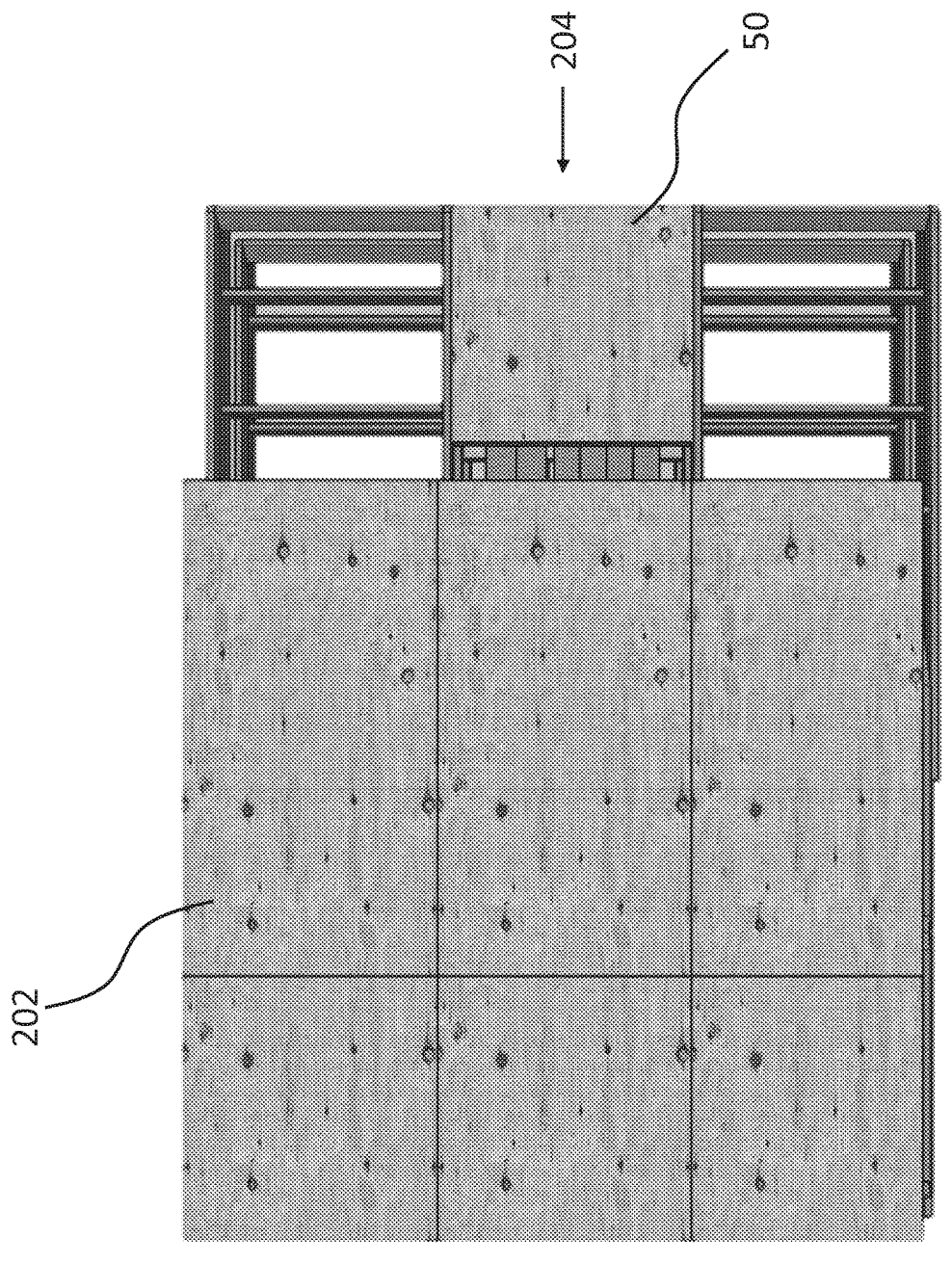
Figure 34:
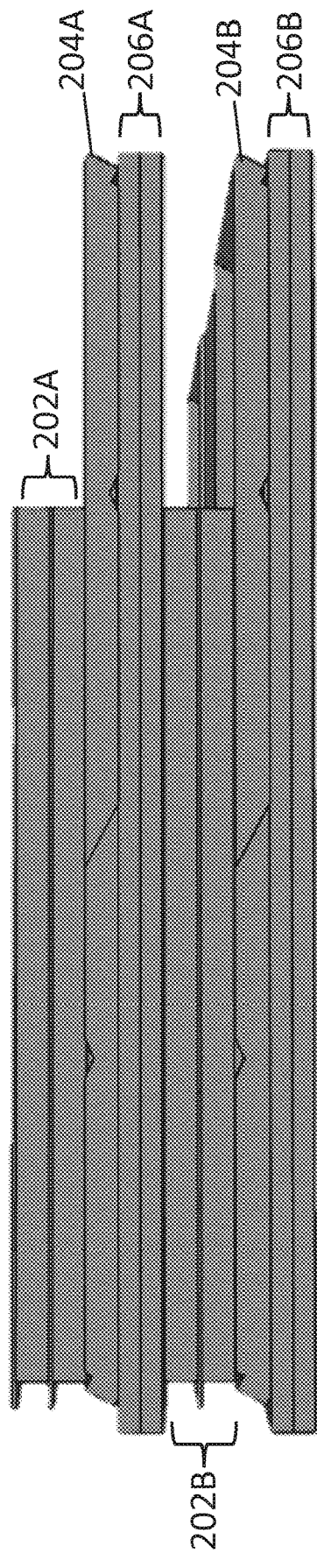
Figure 35:
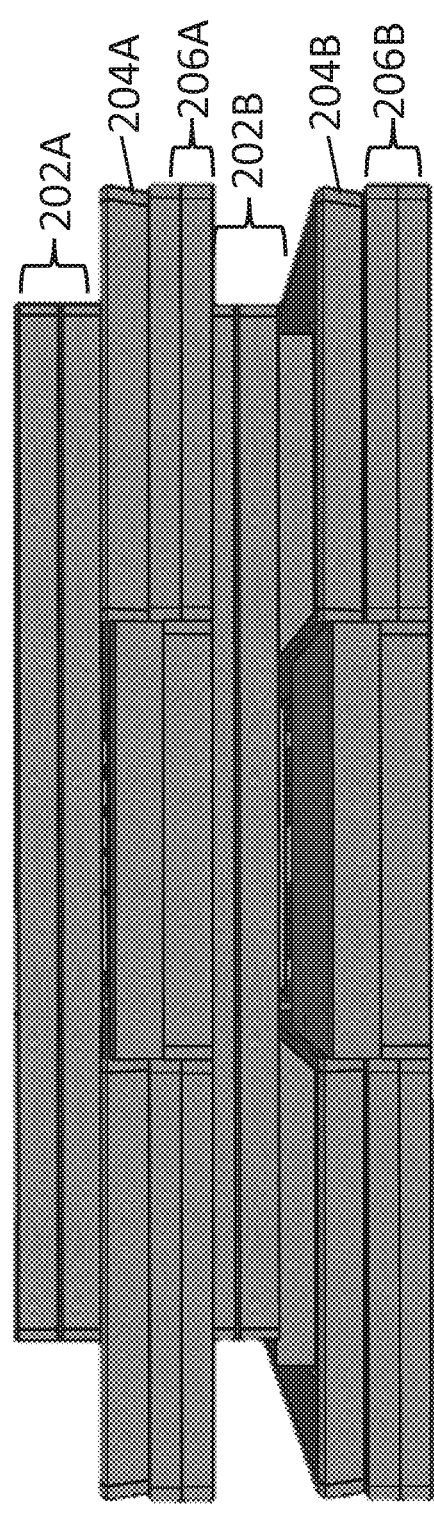
Figure 36:
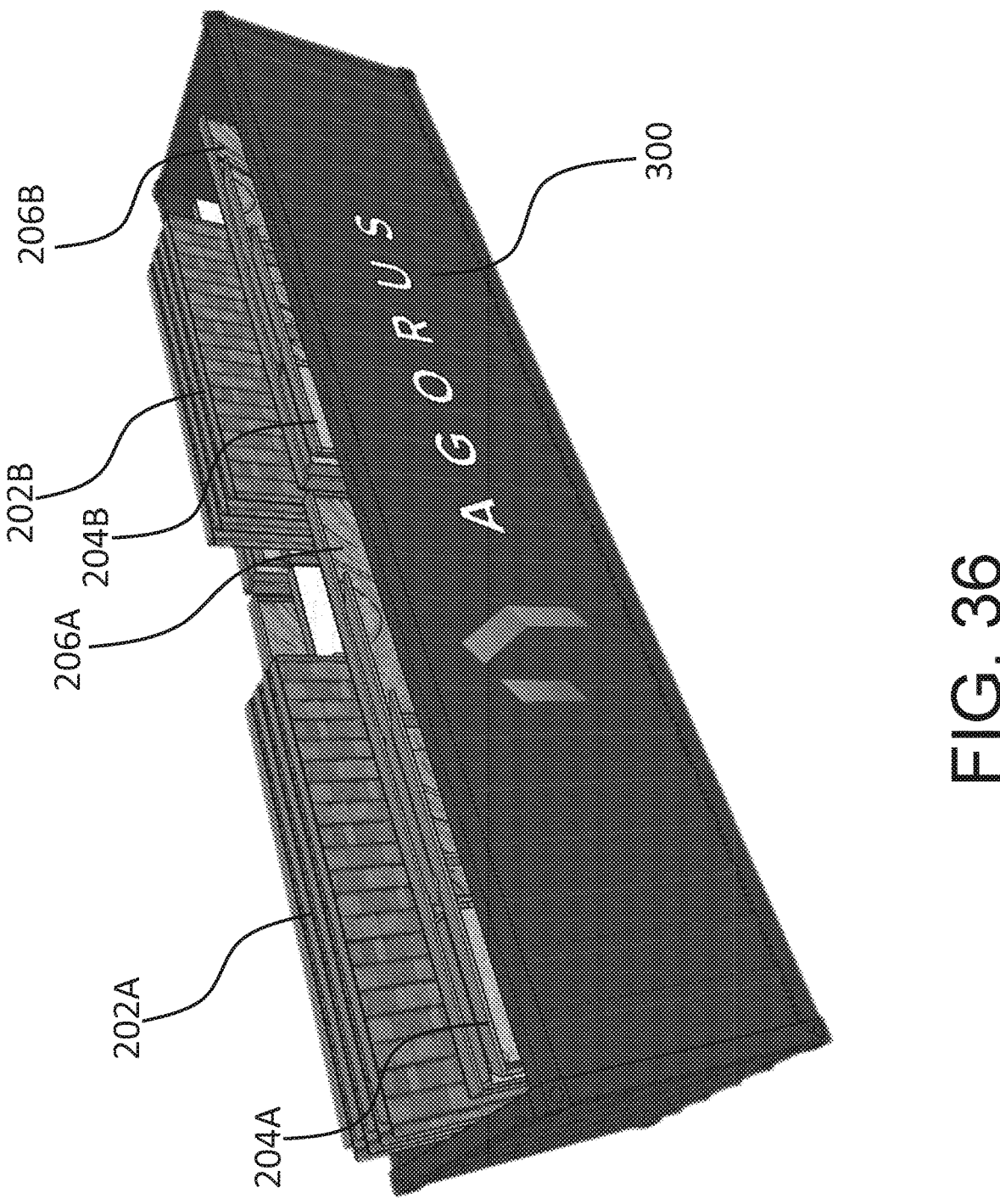
Figure 37:
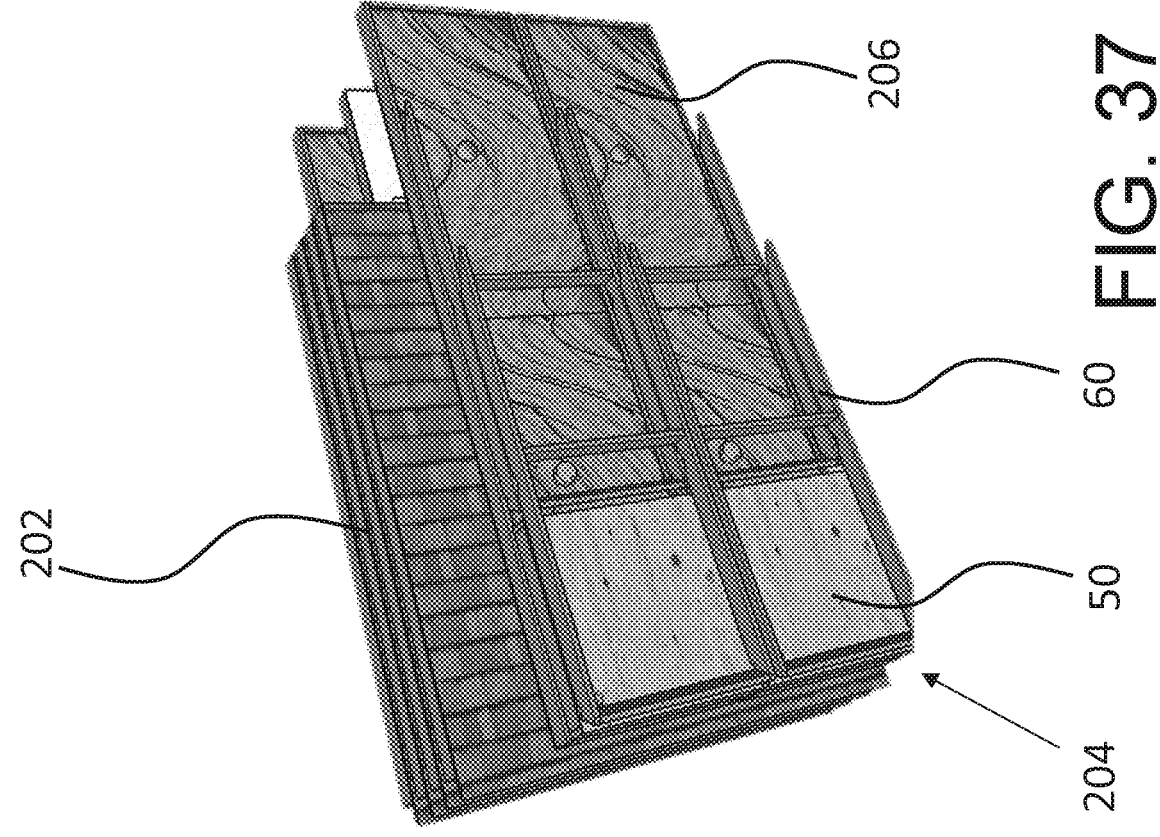

Some examples of prefabricated modular components are shown in FIGS. 32-37. In particular, FIGS. 32-37 show prefabricated roof components 202, 202A, 202B, truss components 204, 204A, 204B, and ceiling components 206, 206A, 206B. The roof components, truss components, and ceiling components are in a collapsed state such that they are substantially planar and can be stacked horizontally or vertically. For example, vertical member or ridge panel 50 of the truss component can be collapsed and in alignment with the sloped member or frame 60 of the truss component such that they both are oriented in parallel planes, as shown in FIG. 37. The roof components 202, 202A, 202B and ceiling panel components 206, 206A, 206B can be stacked in parallel to the truss components 204, 204A, 204B as the roof and ceiling panel components are already planar. The roof components, truss components, and ceiling panel components can be assembled together to manufacture a roof at a construction site. FIGS. 32-25 show these components stacked horizontally in parallel planar orientations, while FIGS. 36 and 37 shows these components stacked vertically in parallel planar orientations for shipping. FIG. 36 shows these components stacked vertically in a modified shipping container 300, with FIG. 37 showing the load bundle. Exemplary dimensions of the prefabricated roof components, truss components, and ceiling panel components are: 6-12 feet wide×8-24 feet long (roof components); 4 feet wide×6-20 feet long (truss components); and, 4 feet wide× 12-24 feet long (ceiling panel components). The prefabricated roof components 202, 202A, 202B, truss components 204, 204A, 204B, and ceiling panel components 206, 206A, 206B can be loaded and unloaded through the open top of the modified shipping container 300 by way of a crane. Upon unloading at a construction site, they can be assembled together on leveled ground of a construction site or directly on a roof of a house under construction thus forming a roof or roof component. The prefabricated modular components can be made of material used in the construction arts, such as lumber, composite, polymer, steel, and aluminum, or combinations thereof, and assembled together with fasteners such as nails, screws, and bolts. Prefabricated roof components 202, 202A, 202B, can include bare roof panels such as those shown in FIGS. 32 and 33 or can include a layer of roofing material such as preinstalled shingles such as those shown in FIGS. 36 and 37. Other roofing materials such as shakes and tile are also possible alternatives.

The present disclosure has described particular implementations having various features. In light of the disclosure provided above, it will be apparent to those skilled in the art that various modifications and variations can be made without departing from the scope or spirit of the disclosure. One skilled in the art will recognize that the disclosed features may be used singularly, in any combination, or omitted based on the requirements and specifications of a given application or design. When an implementation refers to "comprising" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

The invention claimed is:

1. A method, comprising:
providing or assembling a rectangular horizontal member;
joining a vertical member to the rectangular horizontal member such that the vertical member bisects a length of the horizontal member and forms a T-junction at the horizontal member;
joining first and second sloped members to the rectangular horizontal member and vertical member such that the first and second sloped members span from a top of the vertical member to opposing ends of the horizontal member, each first and second sloped member having a groove cut into an underside portion; and
joining first and second support members such that the first and second support members span from first ends disposed on either side of the T-junction between the vertical member and horizontal member to opposing second ends which only make direct contact with work points on the underside portion of each of the first and second sloped members at each groove, wherein the second ends of the first and second support members are precision cut male ends which are mated with each groove;
wherein no additional support members are joined such that each of the first and second sloped members has no more than one work point disposed on their respective underside portions between the top of the vertical member and each opposing end of the horizontal member.

2. The method of claim 1, wherein the rectangular horizontal member is a panel.

3. The method of claim 1, wherein the vertical member is a panel.

4. The method of claim 1, wherein the first and second sloped members are panels.

5. The method of claim 1, wherein first and second support members are planks.

6. The method of claim 1, wherein the rectangular horizontal member is a frame.

7. The method of claim 1, wherein the vertical member is a plank.

8. The method of claim 1, wherein the first and second sloped members are frames.

9. The method of claim 1, wherein the first and second support members are frames.

10. The method of claim 1, wherein the first and second support members are panels.

11. The method of claim 1, wherein the rectangular horizontal member, vertical member, first and second sloped members, and first and second support members are made of wood.

12. The method of claim 1, wherein when assembled together the rectangular horizontal member, vertical member, first and second sloped members, and first and second support members form a truss unit for manufacture of a roof structure.

13. The method of claim 12, further comprising joining a roof structure overlying the truss unit.

14. The method of claim 13, further comprising joining filler units representing ceiling panels or frames to flank on either side of the truss unit, wherein the roof structure is joined to overlie the truss unit and flanking filler units.

15. The method of claim 13, further comprising joining two truss units to flank a filler unit representing a ceiling panel or frame, wherein the roof structure is joined to overlie the filler unit and flanking truss units.

16. The method of claim 14, further comprising joining a plank spanning a top of the truss unit and a width of each of the flanking filler units, the plank forming a ridge to support the roof structure.

17. The method of claim 15, further comprising joining a plank spanning a top of the two truss units and a width of the filler unit therebetween, the plank forming a ridge to support the roof structure.

18. The method of claim 13, wherein the roof structure comprises panels overlying alternating truss units and filler units representing ceiling panels or frames.

19. The method of claim 13, wherein the roof structure comprises a frame, panels overlying the frame, and roofing material overlying the panels.

20. The method of claim 19, further comprising weaving a web of wiring to connect and compress members of the frame of the roof structure.

21. The method of claim 1, wherein the steps of the method are performed on the ground of a construction site.

22. A method comprising loading a shipping container with first, second, and third planar prefabricated modules capable of forming the truss unit and roof structure of claim 14 as cargo in the interior of the shipping container through an open top of the shipping container, the prefabricated modules stacked vertically in parallel orientation.

23. The method of claim 22, wherein:

the first prefabricated module comprises the rectangular horizontal member;

the second prefabricated module comprises the vertical member, first and second sloped members, and first and second support members collapsed in parallel orientation to each other; and the third prefabricated module comprises the roof structure.

* * * * *